US011146607B1

(12) United States Patent
Tang et al.

(10) Patent No.: US 11,146,607 B1
(45) Date of Patent: Oct. 12, 2021

(54) SMART NOISE CANCELLATION

(71) Applicant: Dialpad, Inc., San Francisco, CA (US)

(72) Inventors: Qian-Yu Tang, Milpitas, CA (US); John Rector, Oakland, CA (US); Kathiravan Ramaswami, San Francisco, CA (US)

(73) Assignee: DIALPAD, INC., San Ramon, CA (US)

( * ) Notice: Subject to any disclaimer, the term of this patent is extended or adjusted under 35 U.S.C. 154(b) by 81 days.

(21) Appl. No.: 16/428,795

(22) Filed: May 31, 2019

(51) Int. Cl.
*H04R 3/04* (2006.01)
*H04L 29/06* (2006.01)
*G10L 21/0224* (2013.01)
*G10L 21/0232* (2013.01)

(52) U.S. Cl.
CPC ........ *H04L 65/601* (2013.01); *G10L 21/0224* (2013.01); *G10L 21/0232* (2013.01); *H04L 65/80* (2013.01); *H04R 3/04* (2013.01)

(58) Field of Classification Search
CPC ............... A61N 1/36038; G01V 1/364; G10L 21/0208; G10L 21/0224; G10L 21/0232; G10L 25/93; G10L 19/12; G10L 25/21; H04L 65/601; H04L 65/80; H04R 3/04; H04R 3/005; H04R 25/505; G06F 1/3215
USPC ..... 381/71.1, 73.1, 94.2; 704/205, 225, 226, 704/233, 236, 253, 500, 228; 725/31; 370/352; 455/422.1
See application file for complete search history.

(56) References Cited

U.S. PATENT DOCUMENTS

| | | | | |
|---|---|---|---|---|
| 6,044,341 | A * | 3/2000 | Takahashi | H04B 15/00 704/226 |
| 7,418,394 | B2 * | 8/2008 | Cowdery | G10L 19/022 704/203 |
| 8,244,523 | B1 * | 8/2012 | Murphy | G10L 25/84 704/205 |
| 9,009,048 | B2 * | 4/2015 | Jang | G10L 15/04 704/253 |
| 9,684,087 | B2 * | 6/2017 | Yang | G01V 1/364 |
| 9,997,168 | B2 * | 6/2018 | Hsu | G10L 21/0208 |
| 10,715,909 | B1 * | 7/2020 | Tourbabin | G10L 25/18 |
| 2002/0116182 | A1 * | 8/2002 | Gao | G10L 21/0364 704/205 |
| 2003/0079222 | A1 * | 4/2003 | Boykin | H04N 21/235 725/31 |

(Continued)

OTHER PUBLICATIONS

"Series G: Transmission Systems and Media, Digital Systems and Networks", ITU-T Telecommunication Standardization Sector of ITU, 28 pgs., Mar. 2005.

(Continued)

*Primary Examiner* — Gerald Gauthier
(74) *Attorney, Agent, or Firm* — Patent Law Works LLP

(57) ABSTRACT

A system and method are described for smart noise cancellation. In some implementations, the system may receive audio data describing an audio signal, which the system may use to determine a set of frames of the audio signal. Spectral analysis, which may include a signal-to-noise ratio estimate, may be performed on the one or more frames of the audio. In some instances, the system may identify a noise frame from among the one or more frames based on the spectral analysis, and may reduce noise in the one or more frames based on the noise frame and the spectral analysis on the one or more frames of the audio signal.

23 Claims, 16 Drawing Sheets

(56) References Cited

U.S. PATENT DOCUMENTS

| | | | | |
|---|---|---|---|---|
| 2004/0049383 | A1* | 3/2004 | Kato | H03H 21/0012 704/226 |
| 2006/0200344 | A1* | 9/2006 | Kosek | G10L 21/0208 704/226 |
| 2009/0214050 | A1* | 8/2009 | Sawashi | H04R 3/04 381/73.1 |
| 2010/0023327 | A1* | 1/2010 | Jung | G10L 21/0208 704/225 |
| 2010/0128882 | A1* | 5/2010 | Yamabe | H03G 3/3089 381/71.1 |
| 2010/0280827 | A1* | 11/2010 | Mukerjee | G10L 15/197 704/236 |
| 2013/0191118 | A1* | 7/2013 | Makino | G10L 21/0216 704/226 |
| 2013/0211831 | A1* | 8/2013 | Kumagai | G10L 21/0208 704/226 |
| 2013/0216058 | A1* | 8/2013 | Furuta | H04R 3/002 381/71.1 |
| 2013/0282369 | A1* | 10/2013 | Visser | G10L 15/20 704/226 |
| 2014/0180682 | A1* | 6/2014 | Shi | G10L 21/0216 704/207 |
| 2014/0200881 | A1* | 7/2014 | Chatlani | G10L 21/0232 704/205 |
| 2015/0004962 | A1* | 1/2015 | Weisbart | H04B 7/0854 455/422.1 |
| 2015/0081287 | A1* | 3/2015 | Elfenbein | G10L 21/0208 704/226 |
| 2015/0100310 | A1* | 4/2015 | Cha | G10K 11/17823 704/228 |
| 2015/0110103 | A1* | 4/2015 | Sridhara | H04L 47/6255 370/352 |
| 2015/0127329 | A1* | 5/2015 | Lamy | G10L 21/0216 704/226 |
| 2015/0127330 | A1* | 5/2015 | Lamy | G10L 21/0216 704/226 |
| 2015/0243300 | A1* | 8/2015 | Muesch | G10L 19/012 704/226 |
| 2015/0364144 | A1* | 12/2015 | Fuchs | G10L 19/012 704/500 |
| 2016/0155441 | A1* | 6/2016 | Panda | G10L 25/51 704/233 |
| 2016/0300582 | A1* | 10/2016 | Vaillancourt | G10L 19/26 |
| 2016/0379663 | A1* | 12/2016 | Oda | G10L 21/0232 381/94.2 |
| 2017/0056654 | A1* | 3/2017 | Tsai | G10L 21/0224 |
| 2017/0345439 | A1* | 11/2017 | Jensen | H04R 25/505 |
| 2018/0012616 | A1* | 1/2018 | Salishev | G10L 21/0216 |
| 2018/0033448 | A1* | 2/2018 | Matsuo | G10L 21/0232 |
| 2018/0088733 | A1* | 3/2018 | Syed | G06F 3/04166 |
| 2019/0027160 | A1* | 1/2019 | Liang | H04R 3/04 |
| 2019/0318755 | A1* | 10/2019 | Tashev | G10L 21/0364 |

OTHER PUBLICATIONS

Series P: Telephone Transmission Quality, Telephone Installations, Local Line Networks, ITU-T Telecommunication Standardization Sector of ITU, 30 pgs., Feb. 2001.

"Digital cellular telecommunications system (Phase 2+); Voice Activity Detector (VAD) for Adaptive Multi-Rate (AMR) speech traffic channels; General description", European Telecommunications Standards Institute 1999, 28 pgs. Release 1998.

Ephraim, Y. et al., "Speech Enhancement Using a Minimum Mean-Square Error Log-Spectral Amplitude Estimator", IEEE Transactions on Acoustics, Speech, and Signal Processing, vol. ASSP-33, No. 2, pp. 443-445, Apr. 1985.

Ephraim, Y. et al., "Speech Enhancement Using a Minimum Mean-Square Error Short-Time Spectral Amplitude Estimator", IEEE Transactions on Acoustics, Speech, and Signal Processing, vol. ASSP-32, No. 6, pp. 1109-1121, Dec. 1984.

* cited by examiner

1001

| Index $i$ | $CB_L(i)$ | $CB_H(i)$ |
|---|---|---|
| 0 | 0 | 1 |
| 1 | 2 | 3 |
| 2 | 4 | 5 |
| 3 | 6 | 8 |
| 4 | 9 | 10 |
| 5 | 11 | 12 |
| 6 | 13 | 15 |
| 7 | 16 | 19 |
| 8 | 20 | 22 |
| 9 | 23 | 26 |
| 10 | 27 | 31 |
| 11 | 32 | 36 |
| 12 | 37 | 42 |
| 13 | 43 | 48 |
| 14 | 49 | 57 |
| 15 | 58 | 66 |
| 16 | 67 | 78 |
| 17 | 79 | 93 |
| 18 | 94 | 112 |
| 19 | 113 | 136 |
| 20 | 137 | 163 |
| 21 | 164 | 202 |
| 22 | 203 | 255 |
| 23 | 256 | 330 |
| 24 | 331 | 512 |

| 1103 ↓ | 1105 ↓ | 1107 ↓ | 1109 ↓ |
|---|---|---|---|
| a in dB | linear a value | f(a) | 1/(b-a) |
| -60 | 0.0000010000 | 749.3063759414 | 0.0000000000 |
| -59.5 | 0.0000011220 | 707.3908770353 | 8195481.6238309800 |
| -59 | 0.0000012589 | 667.8200969652 | 7304230.6856972600 |
| -58.5 | 0.0000014125 | 630.4628743656 | 6509902.4509728400 |
| -58 | 0.0000015849 | 595.1953849319 | 5801956.6665888100 |
| -57.5 | 0.0000017783 | 561.9007309921 | 5170999.3221086200 |
| -57 | 0.0000019953 | 530.4685540373 | 4608657.9969182800 |
| -56.5 | 0.0000022387 | 500.7946669280 | 4107470.7632910000 |
| -56 | 0.0000025119 | 472.7807185610 | 3660787.1711399600 |
| -55.5 | 0.0000028184 | 446.3338478556 | 3262680.0005865400 |
| -55 | 0.0000031623 | 421.3863959753 | 2907866.6113529600 |
| -54.5 | 0.0000035481 | 397.7956057677 | 2591638.8453361200 |
| -54 | 0.0000039811 | 375.5433494571 | 2309800.5522096800 |
| -53.5 | 0.0000044668 | 354.5358696820 | 2058611.9090586800 |
| -53 | 0.0000050119 | 334.7035350194 | 1834739.7952018800 |
| -52.5 | 0.0000056234 | 315.9806091837 | 1635213.5637049900 |
| -52 | 0.0000063096 | 298.3050331375 | 1457385.6227011000 |
| -51.5 | 0.0000070795 | 281.6182193906 | 1298896.3034549900 |
| -51 | 0.0000079433 | 265.8648578058 | 1157642.5489926900 |
| -50.5 | 0.0000089125 | 250.9927322677 | 1031750.0078132900 |
| -50 | 0.0000100000 | 236.9525478073 | 919548.1623831010 |
| -49.5 | 0.0000112202 | 223.6977662078 | 819548.1623830990 |
| -49 | 0.0000125893 | 211.1844537515 | 730423.0685697240 |
| -48.5 | 0.0000141254 | 199.3711335947 | 650990.2450972850 |
| -48 | 0.0000158489 | 188.2186492890 | 580195.6666588820 |
| -47.5 | 0.0000177828 | 177.6900347936 | 517099.9322108620 |
| -47 | 0.0000199526 | 167.7503919475 | 460865.7996918280 |
| -46.5 | 0.0000223872 | 158.3667747961 | 410747.0763291000 |
| -46 | 0.0000251189 | 149.5080803881 | 366078.7171139970 |
| -45.5 | 0.0000281838 | 141.1449456821 | 326268.0000586530 |
| -45 | 0.0000316228 | 133.2496502196 | 290786.6611352950 |
| -44.5 | 0.0000354813 | 125.7960242427 | 259163.8845336120 |
| -44 | 0.0000398107 | 118.7593619519 | 230980.0552209670 |
| -43.5 | 0.0000446684 | 112.1163396159 | 205861.1909058680 |
| -43 | 0.0000501187 | 105.8449382632 | 183473.9795201880 |
| -42.5 | 0.0000562341 | 99.9243706978 | 163521.3563704990 |
| -42 | 0.0000630957 | 94.3350125978 | 145738.5622701100 |

| | | | |
|---|---|---|---|
| -41.5 | 0.0000707946 | 89.0583374685 | 129889.6303454990 |
| -41 | 0.0000794328 | 84.0768552349 | 115764.2548992690 |
| -40.5 | 0.0000891251 | 79.3740542686 | 103175.0007813290 |
| -40 | 0.0001000000 | 74.9343466589 | 91954.8162383099 |
| -39.5 | 0.0001122018 | 70.7430165441 | 81954.8162383100 |
| -39 | 0.0001258925 | 66.7861713356 | 73042.3068569719 |
| -38.5 | 0.0001412538 | 63.0508956082 | 65099.0245097290 |
| -38 | 0.0001584893 | 59.5242079290 | 58019.5666668877 |
| -37.5 | 0.0001778279 | 56.1950192165 | 51709.9932210862 |
| -37 | 0.0001995262 | 53.0520945969 | 46086.5799691828 |
| -36.5 | 0.0002238721 | 50.0850165277 | 41074.7076329907 |
| -36 | 0.0002511886 | 47.2839503275 | 36607.8717114004 |
| -35.5 | 0.0002818383 | 44.6396115783 | 32626.8000058651 |
| -35 | 0.0003162278 | 42.1432353509 | 29078.6661135296 |
| -34.5 | 0.0003548134 | 39.7865471531 | 25916.3884533612 |
| -34 | 0.0003981072 | 37.5617355027 | 23098.0055220966 |
| -33.5 | 0.0004466836 | 35.4614260358 | 20586.1190905872 |
| -33 | 0.0005011872 | 33.4788570634 | 18347.3979520187 |
| -32.5 | 0.0005623413 | 31.6068564968 | 16352.1356370499 |
| -32 | 0.0006309573 | 29.8398200630 | 14573.8562270110 |
| -31.5 | 0.0007079458 | 28.1716907403 | 12988.9630345498 |
| -31 | 0.0007943282 | 26.5969393451 | 11576.4254899272 |
| -30.5 | 0.0008912509 | 25.1103462038 | 10317.5000781329 |
| -30 | 0.0010000000 | 23.7069838529 | 9195.4816238310 |
| -29.5 | 0.0011220185 | 22.3822007052 | 8195.4816238310 |
| -29 | 0.0012589254 | 21.1316056328 | 7304.2306856972 |
| -28.5 | 0.0014125375 | 19.9510534112 | 6509.9024509730 |
| -28 | 0.0015848932 | 18.8366309604 | 5801.9566665888 |
| -27.5 | 0.0017782794 | 17.7846444741 | 5170.9993221086 |
| -27 | 0.0019952623 | 16.7916069764 | 4608.6579969183 |
| -26.5 | 0.0022387211 | 15.8542269635 | 4107.4707632910 |
| -26 | 0.0025118864 | 14.9693973943 | 3660.7871711400 |
| -25.5 | 0.0028183829 | 14.1341854114 | 3262.6800005865 |
| -25 | 0.0031622777 | 13.3458226197 | 2907.8666113530 |
| -24.5 | 0.0035481339 | 12.6016959108 | 2591.6388453361 |
| -24 | 0.0039810717 | 11.8993388010 | 2309.8055220997 |
| -23.5 | 0.0044668359 | 11.2364232561 | 2058.6119090587 |
| -23 | 0.0050118723 | 10.6107519751 | 1834.7397952019 |
| -22.5 | 0.0056234133 | 10.0202511066 | 1635.2135637050 |
| -22 | 0.0063095734 | 9.4629633751 | 1457.3856227011 |
| -21.5 | 0.0070794578 | 8.9370415933 | 1298.8963034550 |
| -21 | 0.0079432823 | 8.4407425391 | 1157.6425489927 |
| -20.5 | 0.0089125094 | 7.9724211778 | 1031.7500078133 |
| -20 | 0.0100000000 | 7.5305252091 | 919.5481623831 |
| -19.5 | 0.0112201845 | 7.1135899221 | 819.5481623831 |
| -19 | 0.0125892541 | 6.7202333996 | 730.4230685697 |

| | | | |
|---|---|---|---|
| -18.5 | 0.0141253754 | 6.3491516378 | 650.9902450973 |
| -18 | 0.0158489319 | 5.9991148232 | 580.1956666589 |
| -17.5 | 0.0177827941 | 5.6689626575 | 517.0999322109 |
| -17 | 0.0199526231 | 5.3576008089 | 460.8657996918 |
| -16.5 | 0.0223872114 | 5.0639972254 | 410.7470763201 |
| -16 | 0.0251188643 | 4.7871787126 | 366.0787171140 |
| -15.5 | 0.0281838293 | 4.5262277071 | 326.2680000587 |
| -15 | 0.0316227766 | 4.2802792330 | 290.7866611353 |
| -14.5 | 0.0354813389 | 4.0485180328 | 259.1638845336 |
| -14 | 0.0398107171 | 3.8301758623 | 230.9800552210 |
| -13.5 | 0.0446683592 | 3.6245289399 | 205.8611909059 |
| -13 | 0.0501187234 | 3.4308955428 | 183.4739795202 |
| -12.5 | 0.0562341325 | 3.2486337400 | 163.5213563705 |
| -12 | 0.0630957344 | 3.0771392559 | 145.7385622701 |
| -11.5 | 0.0707945784 | 2.9158434547 | 129.8896303455 |
| -11 | 0.0794328235 | 2.7642114402 | 115.7642548993 |
| -10.5 | 0.0891250938 | 2.6217402613 | 103.1750007613 |
| -10 | 0.1000000000 | 2.4879572175 | 91.9548162383 |
| -9.5 | 0.1122018454 | 2.3624182555 | 81.9548162383 |
| -9 | 0.1258925412 | 2.2447064493 | 73.0423068570 |
| -8.5 | 0.1412537545 | 2.1344305554 | 65.0990245097 |
| -8 | 0.1584893192 | 2.0312236343 | 58.0195666659 |
| -7.5 | 0.1778279410 | 1.9347417268 | 51.7099932211 |
| -7 | 0.1995262315 | 1.8446625752 | 46.0865799692 |
| -6.5 | 0.2238721139 | 1.7606843748 | 41.0747076329 |
| -6 | 0.2511886432 | 1.6825245414 | 36.6078717114 |
| -5.5 | 0.2818382931 | 1.6099184766 | 32.6268000059 |
| -5 | 0.3162277660 | 1.5426183111 | 29.0786661135 |
| -4.5 | 0.3548133892 | 1.4803915988 | 25.9163884534 |
| -4 | 0.3981071706 | 1.4230199412 | 23.0980055221 |
| -3.5 | 0.4466835922 | 1.3702975049 | 20.5861190906 |
| -3 | 0.5011872336 | 1.3220294050 | 18.3473979520 |
| -2.5 | 0.5623413252 | 1.2780299194 | 16.3521356370 |
| -2 | 0.6309573445 | 1.2381205051 | 14.5738562270 |
| -1.5 | 0.7079457844 | 1.2021275936 | 12.9889630345 |
| -1 | 0.7943282347 | 1.1698801582 | 11.5764254899 |
| -0.5 | 0.8912509381 | 1.1412070668 | 10.3175000781 |
| 0 | 1.0000000000 | 1.1159342731 | 9.1954816238 |
| 0.5 | 1.1220184543 | 1.0938819431 | 8.1954816238 |
| 1 | 1.2589254118 | 1.0748616774 | 7.3042306857 |
| 1.5 | 1.4125375446 | 1.0586740591 | 6.5099024510 |
| 2 | 1.5848931925 | 1.0451068253 | 5.8019566666 |
| 2.5 | 1.7782794100 | 1.0339340184 | 5.1709993221 |
| 3 | 1.9952623150 | 1.0249164739 | 4.6086579969 |
| 3.5 | 2.2387211386 | 1.0178040104 | 4.1074707633 |
| 4 | 2.5118864315 | 1.0123394438 | 3.6607871711 |

| | | | |
|---|---|---|---|
| 4.5 | 2.8183829313 | 1.0082644588 | 3.2626800006 |
| 5 | 3.1622776602 | 1.0053269442 | 2.9078668114 |
| 5.5 | 3.5481338923 | 1.0032891103 | 2.5916388453 |
| 6 | 3.9810717055 | 1.0019353991 | 2.3098005522 |
| 6.5 | 4.4668359215 | 1.0010790590 | 2.0586119091 |
| 7 | 5.0118723363 | 1.0005663653 | 1.8347397952 |
| 7.5 | 5.6234132519 | 1.0002778341 | 1.6352135837 |
| 8 | 6.3095734448 | 1.0001263582 | 1.4573856227 |
| 8.5 | 7.0794578438 | 1.0000527947 | 1.2988963035 |
| 9 | 7.9432823472 | 1.0000200609 | 1.1576425490 |
| 9.5 | 8.9125093813 | 1.0000068537 | 1.0317500078 |
| 10 | 10.0000000000 | 1.0000020785 | 0.9195481624 |
| 10.5 | 11.2201845430 | 1.0000005515 | 0.8195481624 |
| 11 | 12.5892541179 | 1.0000001260 | 0.7304230686 |
| 11.5 | 14.1253754462 | 1.0000000243 | 0.6509902451 |

Figure 11D

SMART NOISE CANCELLATION

TECHNICAL FIELD

This disclosure pertains generally to computerized telephony, audio enhancement technology, and communication systems, and in particular, to a system and method for smart noise cancellation in telephony applications.

BACKGROUND

Frequently audio, such as a phone call, audio-video communications, etc., is recorded in noisy environments, or noise is introduced during transmission of the audio signal. In some instances, the noise may become more noticeable and disruptive, especially as sampling rates increase and as teleconferencing becomes more prevalent.

Noise cancellation has many applications in audio used by cell phones, teleconferencing systems, hearing aid devices, etc. Noise cancellation removes ambient noise from noisy speech so that the listeners do not suffer from the background noise from cars, restaurants, trains, offices, airports, streets, construction sites, etc., thereby improving voice quality and intelligibility of noise-contaminated speech.

The introduction of noise cancellation to a phone call, for example, allows customers to experience superior voice quality with an absence of background noise. However, conventional noise cancellation solutions are inefficient, inaccurate, and fail to eliminate noise in certain circumstances, so the conventional cancellation technologies fail to address the constraints presented by varying sources of audio, such as speech and noise. Often, conventional noise cancellation algorithms are implemented at the end devices, such as smartphones, laptops, and personal computers; however, these algorithms generally fail on server-side applications, for example, where signals from multiple microphones are not available. For instance, smartphones frequently have multiple microphones, which may be used to establish a background noise and thereby reduce noise in a phone call. Further, some previous solutions suffer from a high level of computational complexity, which prevent these solutions from being implemented on a server-side application where the voice channel capacity, in terms of voice channels supported per server, may be an important factor It would be desirable to address these issues.

SUMMARY

Audio data describing an audio signal may be received and a set of frames of the audio signal may be determined using the audio data. In some implementations, determining the one or more frames of the audio signal using the audio data includes performing a Fast Fourier Transform with a windowing function Spectral analysis, including a signal-to-noise ratio estimate, may be performed on the one or more frames of the audio signal, and a noise frame may be identified in the frames based on the spectral analysis. In some implementations, identifying the noise frame includes determining a voicing factor for each of the frames based on the signal-to-noise ratio estimate, and classifying a frame as a noise frame based on a value of the voicing factor. In some implementations, identifying the noise frame further includes verifying the classification of the noise frame using a spectral deviation estimate and/or regional statistical features of the audio signal. In some implementations, determining the voicing factor includes estimating a power spectral density using a time-varying smoothing factor, computing the signal-to-noise ratio estimate based on the power spectral density, and computing the voicing factor based on the signal-to-noise ratio estimate.

Noise in the frames may be reduced based on the noise frame and the spectral analysis on the frames of the audio signal. In some implementations, reducing the noise in the one or more frames may include calculating a log-minimum mean square error ("MMSE") spectral gain based on an a priori signal-to-noise ratio and an a posteriori signal-to-noise ratio, and applying the LOG-MMSE spectral gain to the frames. For instance, the a priori signal-to-noise ratio may be calculated using three different smoothing factor values. In some implementations, reducing the noise in the frames may include generating a table with values of a special function of a LOG-MMSE spectral gain function, and using the table to calculate the LOG-MMSE spectral gain while receiving the audio data.

An attenuation gain may be determined based on a quantity of noise frames in the frames and residual noise in the frames may be removed based the attenuation gain. In some instances, reducing the noise in the frames is performed in a frequency domain and removing the residual noise is performed in a time domain.

The features and advantages described in this summary and in the following detailed description are not all-inclusive and, particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 10 illustrates a table of an example critical band bin distribution.

FIGS. 11A-11D illustrate a table of example values for calculations of a function of a spectral gain function for noise cancellation.

Figure 1:
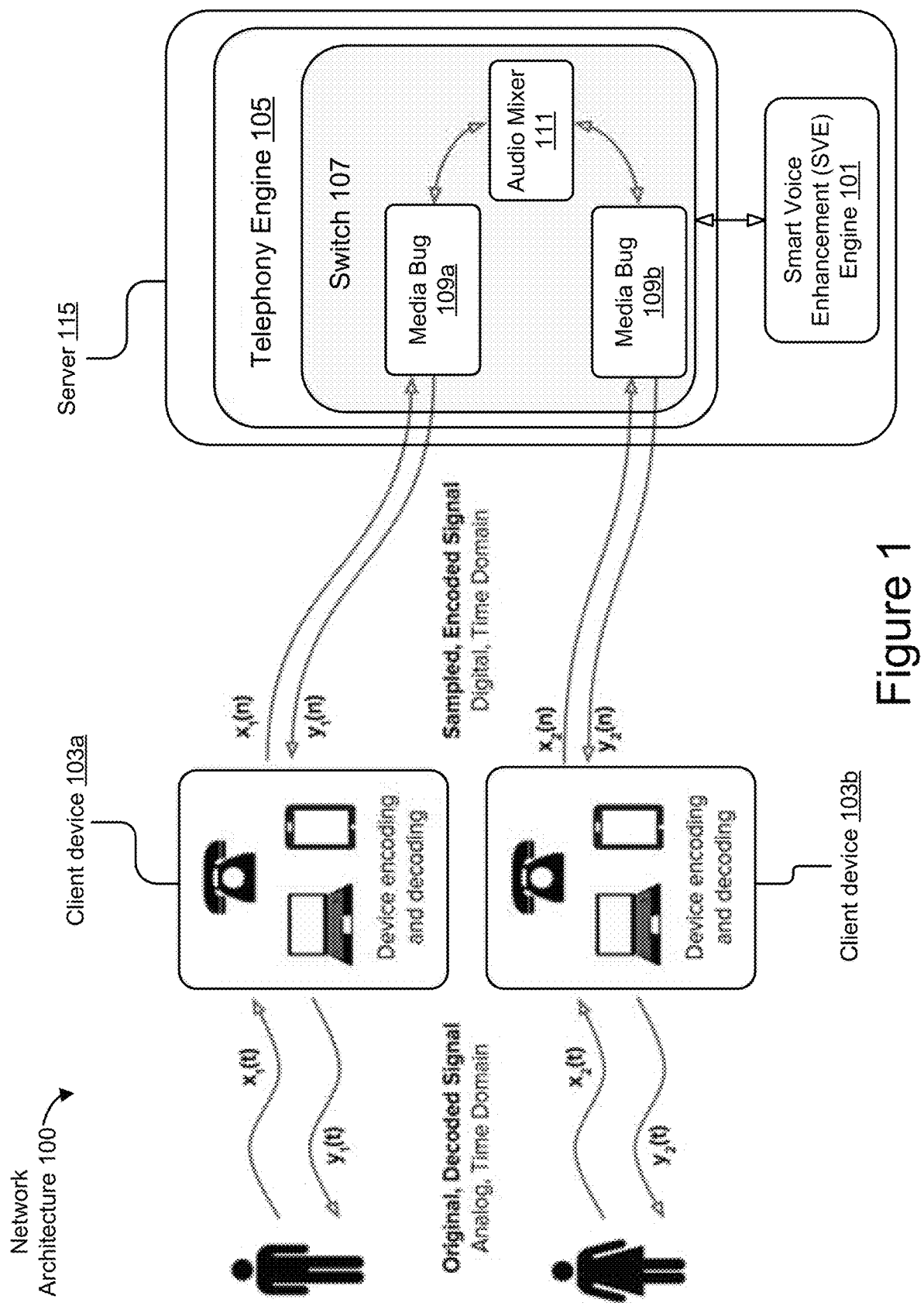
FIG. 1 is a block diagram of an exemplary network architecture in which audio signals may be analyzed.

The Figures depict various example implementations for purposes of illustration only. One skilled in the art will readily recognize from the following discussion that alternative examples of the structures and methods illustrated herein may be employed without departing from the principles described herein.

DETAILED DESCRIPTION

The technology described herein monitors the content and/or sound characteristics of audio signals, automatically detects noise, and, in some instances, may adjust audio enhancement based on the detection of noise. For instance, the disclosure describes a system and method for intelligently removing impairments such as noise and echo in audio signals, for example, in telephony applications. In some implementations, the technology may detect noise in real-time and perform certain audio enhancement (e.g., reducing noise) on the audio in order to deliver a cleaner signal to end users. It should be noted that although the term smart "voice" enhancement is used herein, the technology may be used to process and/or enhance any type of audio.

It should be noted that although the term noise cancellation is used herein, this term may refer to reduction in background sounds in an audio signal and should not be construed to include complete elimination of every possible noise, although this result may be possible. Depending on the implementation, the background sound may include sounds other than voice in an audio signal, such as in telephony. For example, the background sound may include ambient noise from static, traffic, construction, road or wind noise, etc.

According to some implementations, the technology described herein may include smart noise cancellation using algorithms, such as the minimum mean-square error in log-spectral domain algorithm, referred to herein as LOG-MMSE, which uses minimal CPU cycles, in an implementation. In some instances, the implementation for the exponential integral function in the power of another exponential function of LOG-MMSE may use as little as two multiplications, three additions, and a few comparison operations. Further, the improvements described herein do not reduce the accuracy of the LOG-MMSE algorithm while increasing its usefulness and computational efficiency. While other noise cancellation algorithms may be used with the technology herein, the LOG-MMSE may provide a very low signal distortion or "SIG" rating. For example, in terms of overall mean opinion score (MOS), the LOG-MMSE algorithm may perform effectively against noise from a car, a train, or background voice babble. The technology may additionally or alternatively use a variant called LOG-MMSE with noise estimation for noise, such as street noise.

Although the LOG-MMSE algorithm is a highly effective noise cancellation algorithm for voice enhancement, particularly in a single microphone system, the algorithm suffers from high computational complexity due to special functions it may use, such as the modified Bessel functions of zero and first order, as well as the exponential integral function in the power of another exponential function. The technologies described herein reduce computational complexity, thereby enabling the LOG-MMSE algorithm to be efficiently implemented on a server, which may run many parallel phone calls, rather than or in addition to an endpoint device (e.g., which may run only a single phone call), although it should be noted that other implementations are possible and contemplated herein. For instance, a server in telephony may run many phone calls at the same time, and the technologies described herein substantially reduce processing resources, which can be particularly beneficial when compounded over the many simultaneous calls.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

FIG. 1 is a block diagram of an exemplary network architecture 100 in which audio signals may be analyzed. The network architecture 100 may represent a telephony engine data path in which a smart voice enhancement engine 101 may be implemented. The illustrated network architecture may include one or more servers 115 and one or more endpoint client devices 103, which may be communicatively coupled via a network (not illustrated). In some implementations, the client devices 103a and 103b may be coupled via a network and may communicate via and/or receive services provided by the telephony engine 105 and/or a smart voice enhancement engine 101. It is to be understood that, in practice, orders of magnitude more endpoints (e.g., 103) and servers (e.g., 115) can be deployed.

A smart voice enhancement engine 101 is illustrated as residing on a server 115. It is to be understood that, in different implementations, the smart voice enhancement engine 101 can reside on different servers 115, client devices 103, or be distributed between multiple computing systems in different ways, without departing from the scope of this disclosure.

Smart voice enhancement on a server side in a communication system improves voice quality by removing impairments such as noise and echo in telephony applications. In typical voice-over-internet (VOIP) applications, audio packets arrive at the server one by one, at certain pace (e.g., every 20 milliseconds) following the packet time, called p-time, which audio data may be in a time domain.

Noise cancellation on the server side, such as using a smart voice enhancement engine 101 coupled or integrated with the telephony engine 105, may remove ambient noise from noisy speech thereby improving voice quality and intelligibility of noise-contaminated speech. Cancellation performed on client devices 103 (e.g., smartphones, personal computers, etc.) may use multiple microphones to aid noise cancellation, but information from multiple microphones may not be available at a server 115, so the smart voice enhancement engine 101 may apply noise cancellation/reduction to a noise-contaminated audio signal.

Many different networking technologies can be used to provide connectivity from endpoint computer systems 103 to servers 115. Some examples include: LAN, WAN, and various wireless technologies. Endpoint systems 103 are able to access applications and/or data on server 115 using, for example, a web browser or other endpoint software (not shown). Endpoint client devices 103 can be in the form of, for example, desktop computers, laptop computers, smartphones, analog phones, or other communication devices capable of sending and/or receiving audio. Servers 115 can be in the form of, for example, rack mounted or tower computers or virtual servers implemented as software on a computing device, depending on the implementation.

Although FIG. 1 illustrates two endpoints 103 and one server 115 as an example, in practice many more (or fewer) devices can be deployed as noted above. In some implementations, the network is in the form of the internet, a public switched telephone network (PSTN), and/or a different communication system. Other networks or network-based environments can be used in addition to or instead of the internet in other implementations.

As illustrated in FIG. 1, a user may communicate with a client device 103a using speech or other audio, which may be received by the client device 103a as analog time-domain audio. In some implementations, the client device 103a may transmit the audio to the server 115 in a digital time-domain audio signal, although other implementations are possible. For instance, the telephony engine 105 may receive the audio signal from the client device 103a and, using a switch 107 may relay the audio to a second client device 103b, which may convert the audio signal to audio using an output device. It should be noted that the telephony engine 105 may enable two-way communication between the client devices 103.

The telephony engine 105 may include a switch 107 and, in some implementations, a smart voice enhancement engine 101. In some implementations, the switch 107 may include an application server that enables real-time communication of audio and/or video using telecommunications and/or VoIP, for example. The switch 107 may run one or more media bugs 109a and 109b, an audio mixer 111, and, in some instances, a smart voice enhancement engine 101 or components thereof.

Figure 3:
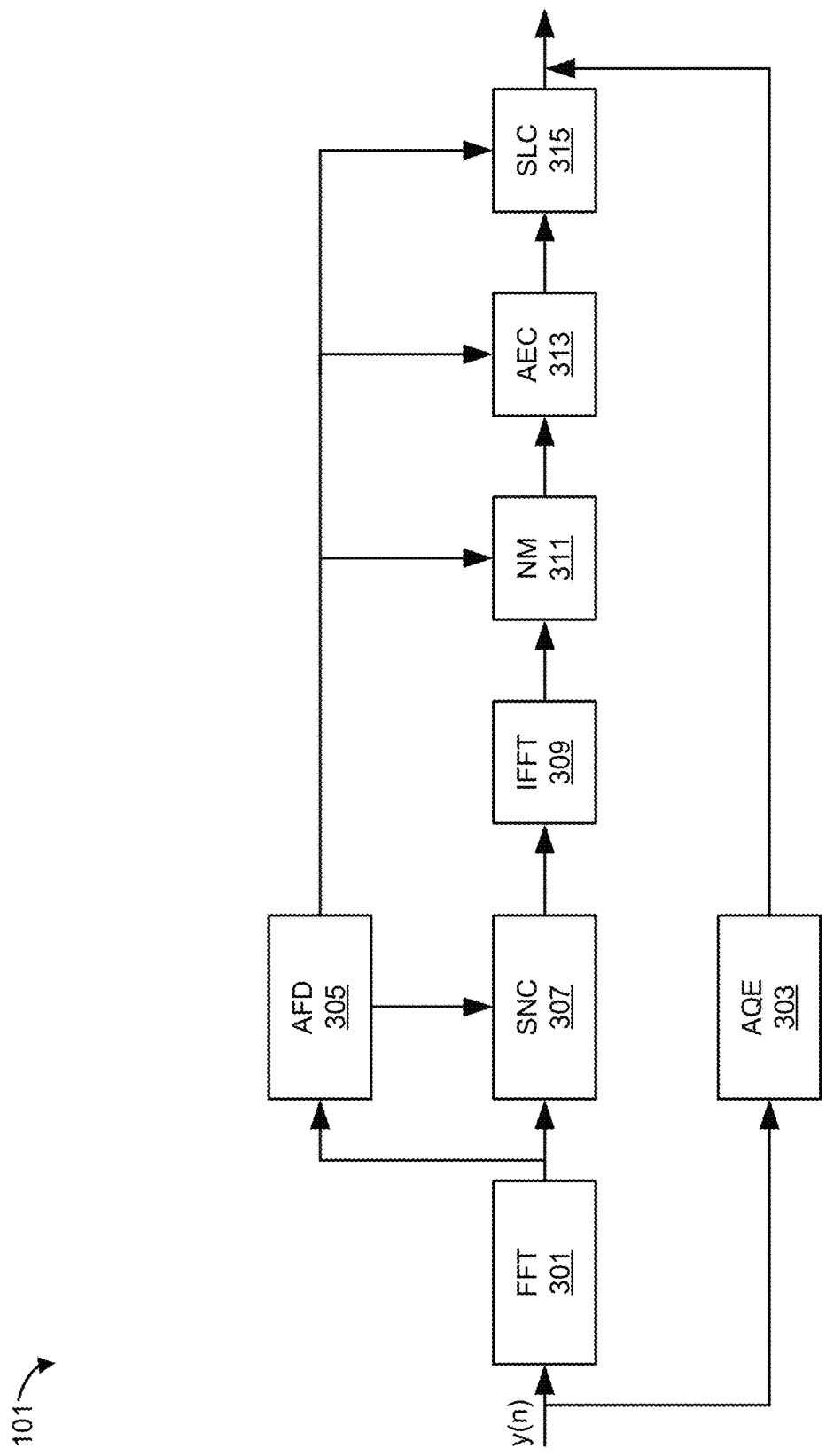
FIG. 3 is a block diagram of a smart voice enhancement engine.

In some implementations, a media bug 109 may include a dynamic library that provides an interface between one or more of the client devices 103, the smart voice enhancement engine 101, the audio mixer 111, the switch 107, and one or more other components of the telephony engine 105, such as a management interface (not shown). The audio mixer 111 may adjust volume levels, tones, or other elements of an audio signal, or perform other operations, depending on the implementation. The management interface may provide configuration and parameter setup for the modules smart voice enhancement engine 101, such as are shown in FIG. 3.

In some implementations, the smart voice enhancement engine 101 may include a library implemented on top of the switch 107 platform, but independent of the switch 107 as a stand-alone library. The smart voice enhancement engine 101 may operate on the server 115, although it is possible for it to operate on one or more of the client devices 103 without departing from the scope of this disclosure. The smart voice enhancement engine 101 may improve voice quality in a communication system by removing impairments such as noise and echo in telephony applications. For instance, as described in further detail in reference to FIGS. 4-7, the smart voice enhancement engine 101 may detect noise and reduce it in order to deliver cleaner audio (e.g., voice) to end users on client devices 103.

One or more of the components of the telephony engine 105 (e.g., the switch 107, media bug 109, audio mixer 111, or smart voice enhancement engine 101) may include software including logic executable by a processor to perform their respective acts, although the component may be implemented in hardware (e.g., one or more application specific integrated circuits (ASICs) coupled to a bus for cooperation and communication with the other components of the telephony engine 105 and/or network architecture 100; sets of instructions stored in one or more discrete memory devices (e.g., a PROM, FPROM, ROM) that are coupled to a bus for cooperation and communication with the other components of the system; a combination thereof; etc.).

Figure 2:
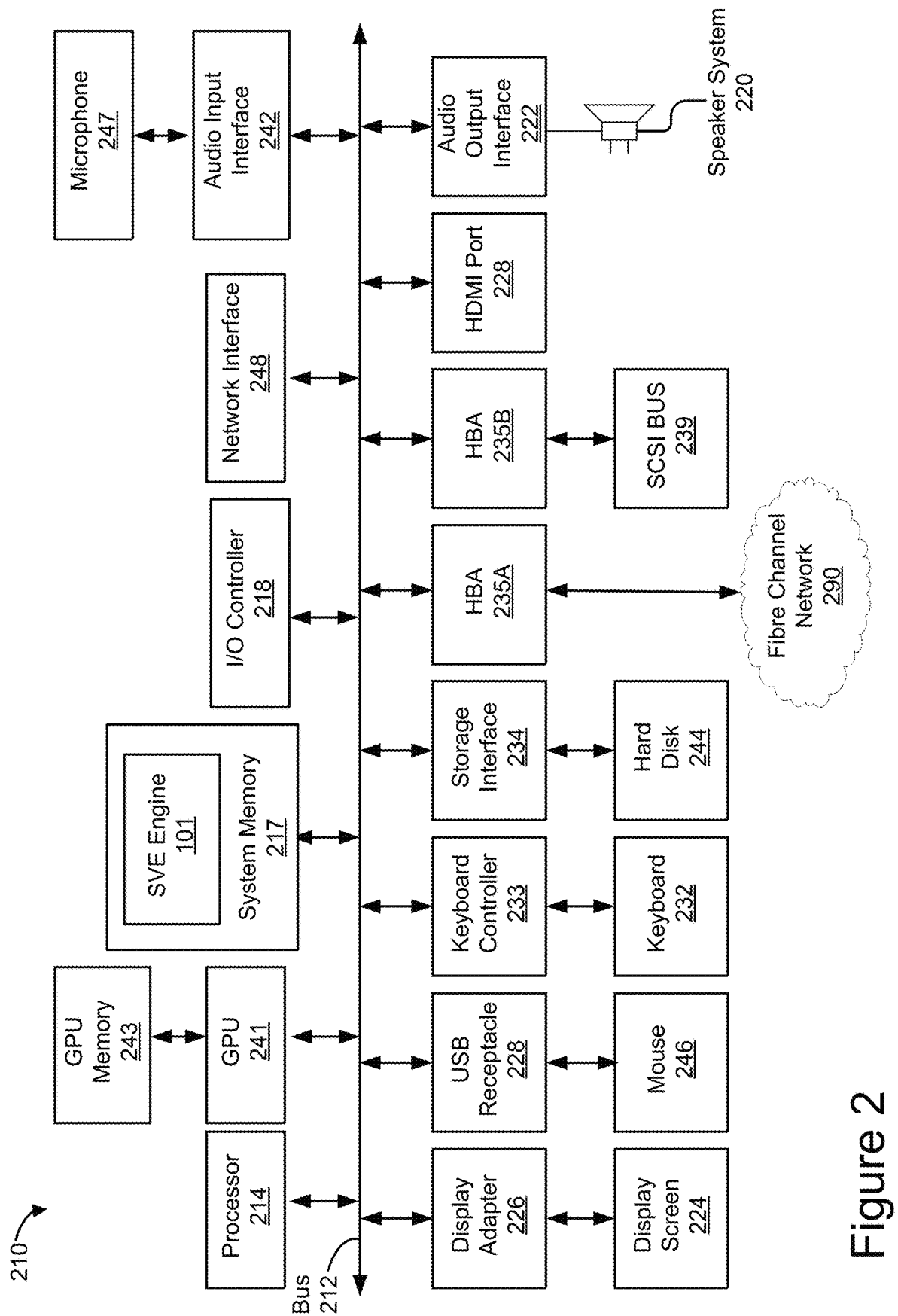
FIG. 2 is a block diagram of a computer system suitable for implementing a smart voice enhancement and noise cancellation system.

FIG. 2 is a block diagram of a computer system 210 suitable for implementing a smart sound enhancement and noise cancellation system. For instance, the computer system 210 may represent a server 115, which may execute the operations of the smart voice enhancement engine 101.

Endpoints 103 and servers 115 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), a graphics processing unit (GPU) 241, GPU memory 243, an input/output (I/O) controller 218, an audio input interface 242 communicatively coupled to an audio input device such as a microphone 247, an audio output interface 222 communicatively coupled to an audio output device such as a speaker 220, a display adapter 226 communicatively coupled to a video output device such as a display screen 224, one or more interfaces such as Universal Serial Bus (USB) ports 228, High-Definition Multimedia Interface (HDMI) ports 230, serial ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fiber Channel (FC) or other network 290, an HBA interface card 235B configured to connect to a SCSI bus 239, a mouse 246 (or other pointing device) coupled to the bus 212, e.g., via a USB port 228, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones, tablets, and some servers typically do not have external keyboards 242 or external pointing devices 246, although various external components can be coupled to mobile computing devices via, e.g., USB ports 228). In different implementations the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, solid state drive, flash memory) and loaded into system memory 217 and executed by the processor 214. Application programs can also be loaded into system memory 217 from a remote location (i.e., a remotely located computer system 210), for example via the network interface 248. In FIG. 2, the smart voice enhancement engine 101 is illustrated as residing in system memory 217. The workings of the smart voice enhancement engine 101 are explained in greater detail below in conjunction with FIGS. 3-11D.

The storage interface 234 is coupled to one or more hard disks 244 (and/or other standard storage media). The hard disk(s) 244 may be a part of computer system 210, or may be physically separate and accessed through other interface systems.

The network interface 248 can be directly or indirectly communicatively coupled to a network such as the Internet, a PSTN, etc. Such coupling can be wired or wireless.

FIG. 3 illustrates an example smart voice enhancement engine 101. As described above, the functionalities of the smart voice enhancement engine 101 can reside on specific computers 210 (endpoints 103, servers 115) or be otherwise distributed between multiple computer systems 210, including within a cloud-based computing environment in which the functionality of the smart voice enhancement engine 101 is provided as a service over a network. It is to be understood that although the smart voice enhancement engine 101 is illustrated in FIG. 3 as single entity with several components, the illustrated smart voice enhancement engine 101 represents a collection of functionalities, which can be instantiated as a single or multiple modules as desired (an instantiation of an example multiple module smart voice enhancement engine 101 is illustrated in FIG. 3). It is to be understood that the modules of the smart voice enhancement engine 101 can be instantiated (for example as object code or executable images) within the system memory 217 (e.g., RAM, ROM, flash memory) (and/or the GPU memory 243) of any computer system 210, such that when the processor(s) 214 (and/or the GPU 241) of the computer system 210 processes a module, the computer system 210 executes the associated functionality. In some implementations, the GPU 241 can be utilized for some or all of the processing of given modules of the smart voice enhancement engine 101. In different implementations, the functionality of some or all of the modules of the smart voice enhancement engine 101 can utilize the CPU(s) 214, the GPU 241, or any combination thereof, as well as system memory 217, GPU memory 243, or any combination thereof as desired.

As used herein, the terms "computer system," "computer," "endpoint," "endpoint computer," "server," "server computer" and "computing device" mean one or more computers configured and/or programmed to execute the described functionality. Additionally, program code to implement the functionalities of the smart voice enhancement engine 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

The smart voice enhancement engine 101 may use speech signal processing algorithms to enhance voice quality for VoIP, wireless, and PSTN telephony applications. As shown in the example illustrated in FIG. 3, the smart voice enhancement engine 101 may include a Fast Fourier Transform (FFT) module 301, smart noise cancellation (SNC) module 307, inverse Fast Fourier Transform (IFFT) module 309, noise muting (NM) module 311, acoustic echo cancellation (AEC) module 313, smart level control (SLC) module 315, audio quality evaluation (AQE) module 303, and/or an audio feature detection (AFD) module 305. In some implementations, although not illustrated in FIG. 3, the smart voice enhancement engine 101 may include functionality instantiating a voice activity detection algorithm (not shown), which may be incorporated or communicatively coupled with the audio feature detection module 305.

Depending on the implementation, the FFT module 301 may convert an original time domain signal {y(n)} to a frequency domain. An audio feature (e.g., a noise or voice activity) detection module 305 may operate in the frequency domain and may employ the fact that the frequency spectrum for noise tends to be flat. The other modules (e.g., 307, 309, 311, 313, or 315) may use the output of the audio feature detection module 305 to identify music, speech, or noise.

Figure 5:
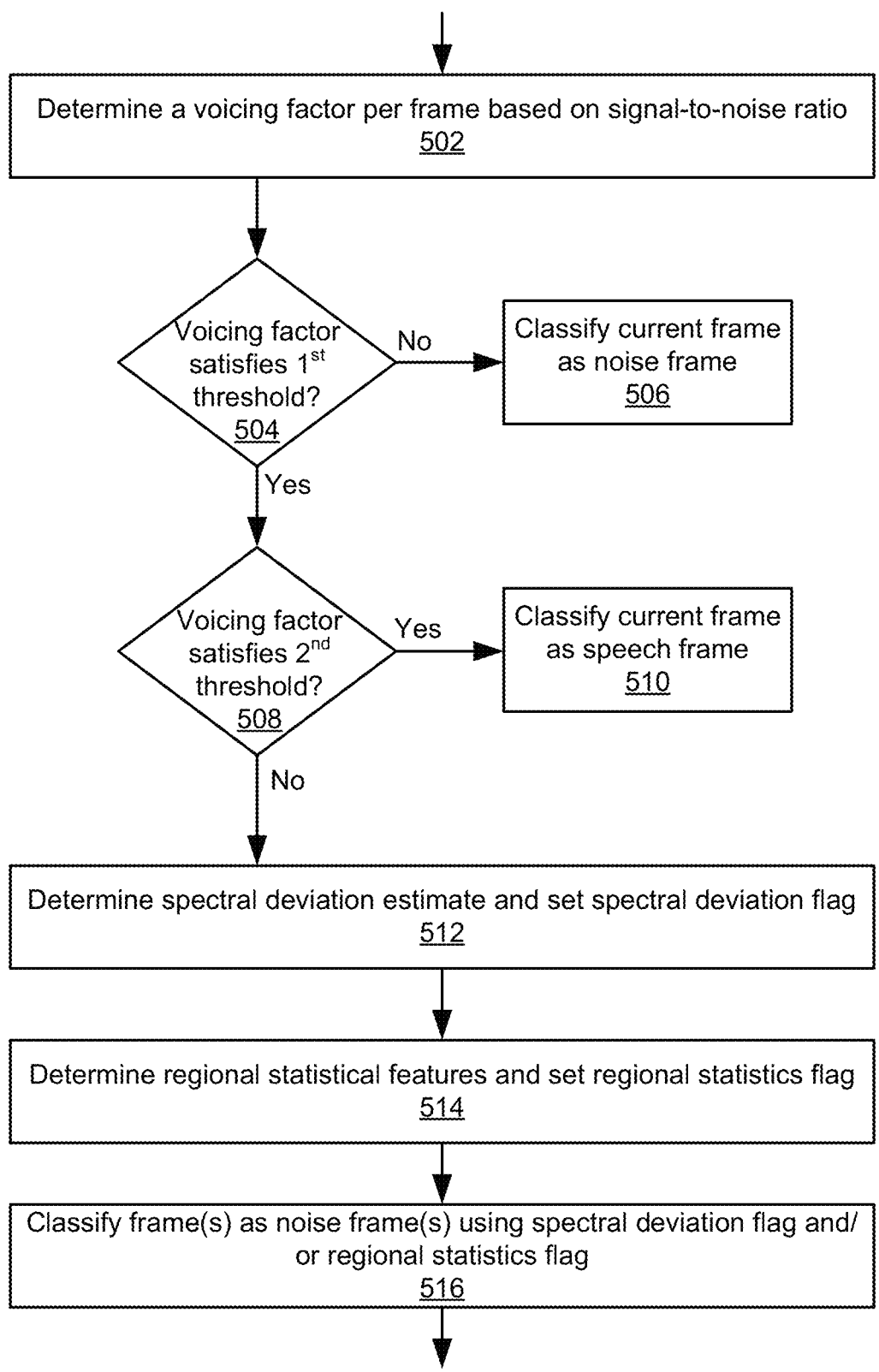
FIG. 5 is a flowchart of an example method for identifying noise in an audio signal.
Figure 6:
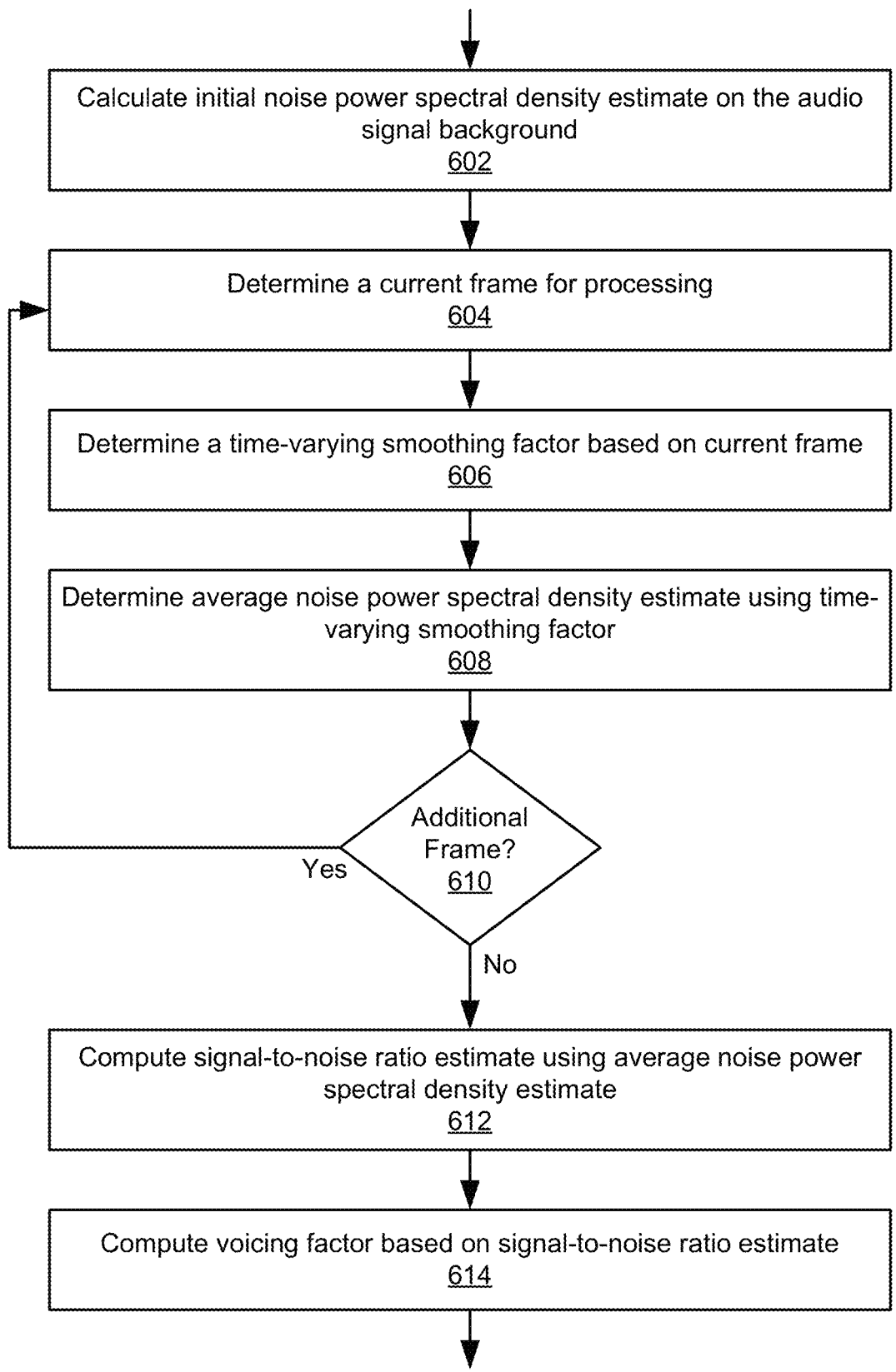
FIG. 6 is a flowchart of an example method for computing a voicing factor, according to some implementations

In some implementations, the audio feature detection module 305 may perform some or all of the operations described in reference to FIGS. 5 and 6 for detecting noise. For instance, the audio feature detection module 305 may include an accurate noise or voice activity detector in order to identify noise and speech frames, which detection may be used by the smart noise cancellation module 307 to reduce noise. It should be noted that the audio feature detection module 305 may include sub-components, algorithms, or routines, for example, which may perform one or more of the operations described in reference to the audio feature detection module 305.

In some implementations, the audio feature detection module 305 may obtain an initial noise power spectral density estimate and may combine arithmetic averaging and a recursive filter to identify noise. This operation for updating the noise power spectral density may be implemented in real-time and may use only the first one or two frames of the audio containing noise frames, which allows the audio feature detection module 305 to obtain an accurate noise power spectral density estimate. In some implementations, the audio feature detection module 305 may identify a noise frame using regional statistic features, which may have a very short response time and represent statistics of the signal spectral deviation in the past region, which may be about 0.2 seconds, for example.

Using the features of the audio feature detection module 305, the performance of the smart noise cancellation of real-time noise is improved. For instance, the operations performed by the audio feature detection module 305 allow the smart voice enhancement engine 101 to more accurately address situations where noise profiles change during a phone call (e.g., from silence to very noisy environments), where conventional detection algorithms may have difficulty identifying noise and speech frames.

The smart noise cancellation module 307 may remove ambient noise in the frequency domain, so that the listener feels more comfortable when listening to the speech with the noise removed. In some implementations, the smart noise cancellation module 307 may use an approach for a priori signal-to-noise ratio estimate using with three smoothing factors ($\alpha$, $\beta$, $\mu$), although additional or fewer smoothing factors may be used in other implementations. For example, the smart noise cancellation module 307 may use three smoothing factors ($\alpha$, $\beta$, $\mu$) to provide better noise cancellation performance in terms of PESQ scores (e.g., determined by the audio quality evaluation module 303, described below). It should be noted that, depending on the specific circumstances of the audio signal, different smoothing factors may be used. For example, in a decision-direct approach containing only one smoothing factor $\alpha$, a small a may be preferred for stationary noise, while a relatively larger a performs better at noise cancellation for non-stationary noise. Depending on the implementation, the smart noise cancellation module 307 may use three different smoothing factors, thereby providing more options to achieve better noise reduction performance. The operations of the smart noise cancellation module 307 are further described throughout this disclosure, for example, in reference to FIG. 7.

The noise muting module 311 may provide noise muting to reduce residual noise after noise cancellation by the smart noise cancellation module 307 (e.g., described in reference to FIG. 7 below). For example, the noise muting module 311 may perform non-linear processing to remove residual noise after the frequency-domain noise cancellation. For instance, the noise muting module 311 may act on a time domain signal (e.g., after processing by the IFFT module 309). In some implementations, the attenuation gain in the noise muting module 311 may be adapted using a noise counter with the consideration of signal distortion and noise intrusiveness. Example operations for noise muting are described in further detail below, for example, in reference to FIG. 4.

In some implementations, the noise muting module 311 may be integrated with the smart noise cancellation module 307 or the acoustic echo cancellation module 313, although it may be a separate module in other implementations.

The IFFT module 309 may convert the frequency domain signal back to time domain by using the Inverse Fast Fourier Transform. The acoustic echo cancellation module 313 and smart level control module 315 may operate in the time domain to cancel acoustic echo and control audio volume levels, respectively.

The audio quality evaluation module 303 may use objective voice quality measurement algorithms to monitor smart voice enhancement for the audio signals before and after smart voice enhancement. In some implementations, the audio quality evaluation module 303 may use ITU (International Telecommunications Union) standards for quality assessment, such as a G.107 E-model and/or a Perceptual Evaluation of Speech Quality (PESQ) test(s) to monitor quality of the audio signal. For example, the audio quality evaluation module 303 may compare speech output in the outgoing audio signal with original clean audio in the incoming audio signal in order to get a mean opinion score (MOS). In some implementations, the G.107 E-model in the audio quality evaluation module 303 may provide real-time and non-intrusive voice quality measurement, for example, in terms of the MOS value for each call. The MOS may represent a score of ratings gathered in a quality evaluation test, which may be manually or algorithmically performed.

Figure 4:
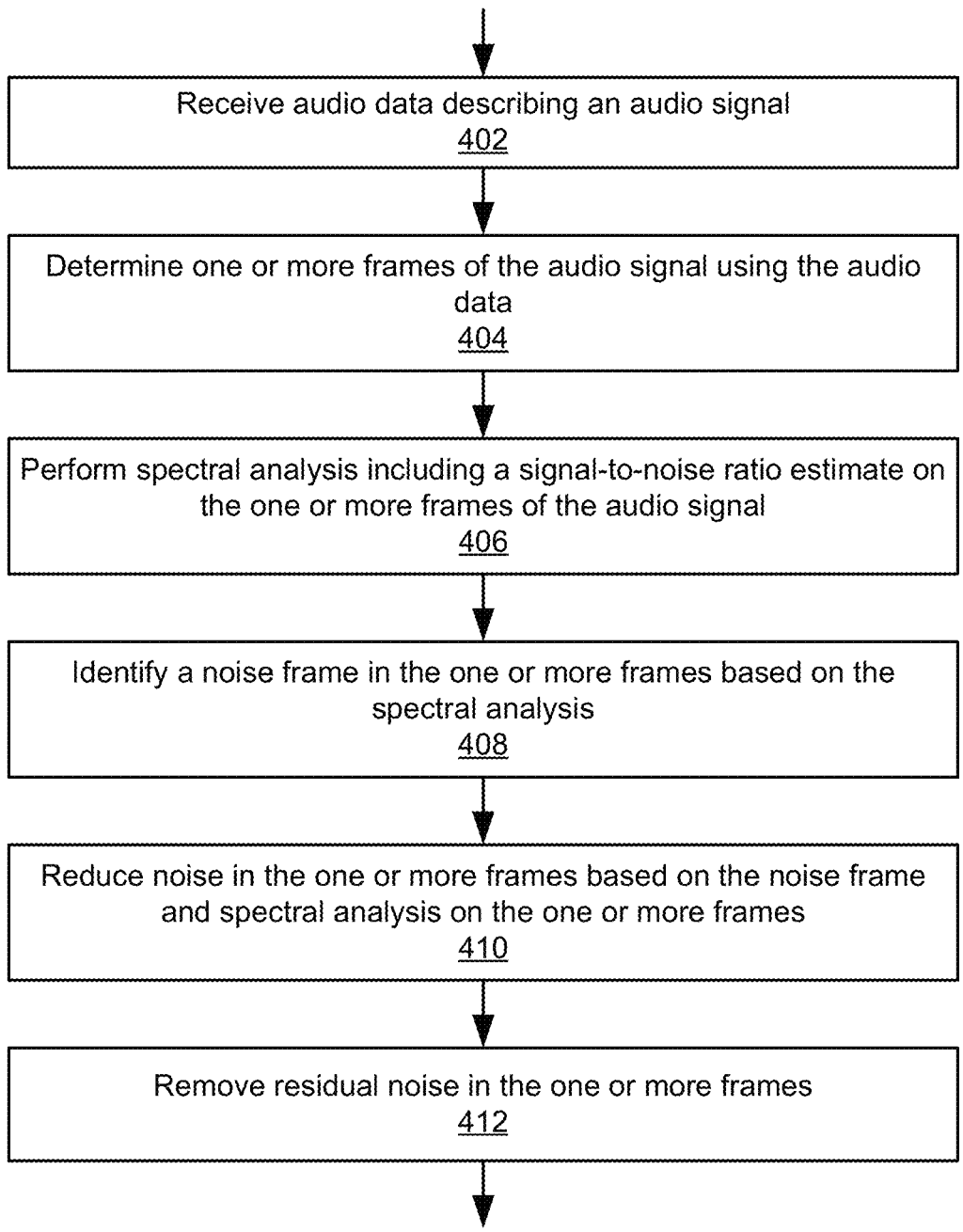
FIG. 4 is a flowchart of an example method for smart noise cancellation of an audio signal, according to some implementations.

FIG. 4 is a flowchart of an example method for smart noise cancellation of an audio signal. In some implementations, at 402, the smart voice enhancement engine 101 may receive audio data describing an audio signal. For example, the smart voice enhancement engine 101 may receive an audio speech signal at a speech decoder, as illustrated in FIG. 1. The audio data may be in any audio format that may be processed by the smart voice enhancement engine 101 or one of its components. For example, the audio data may be a digital file representing a time-domain based signal.

Suppose that $\{x(n)\}$ is the clean speech signal and $\{d(n)\}$ is the additive noise. $\{y(n)\}$ is the noisy speech signal received by the smart voice enhancement engine 101 in FIG. 3, after the speech decoder such as G. 711, G.722, and Opus, etc. For instance, $\{y(n)\}$ is noise-contaminated speech signal as the sum of $\{x(n)\}$ and $\{d(n)\}$:

$$y(n)=x(n)+d(n). \tag{1}$$

At 404, the smart voice enhancement engine 101 may determine a set of frames of the audio signal using the audio data. For instance, the smart voice enhancement engine 101 (e.g., the FFT module 301) may perform Fast Fourier Transform framing with a windowing function.

For example, the discrete Fourier transform (DFT) of the time-domain signal $\{y(n)\}$ is given as follows:

$$Y(m, k) = \sum_{n=0}^{N-1} y(n + mH)w(n)e^{-j2\pi kn/N}, 0 \le k \le N - 1, \tag{2}$$

where m is the frame number, k is the frequency bin, H is the frame hop size, N is the fast Fourier transform (FFT) size, w(n) is the window function, and n∈[0, N−1]. Example window functions may include rectangular, Bartlett, Hanning, Hamming, Blackman, or Kaiser windows, etc.

Similarly, it should be noted that, for use by the IFFT module 309 (or another component of the smart voice enhancement engine 101), the inverse DFT is given by $$y(n + mH) = \frac{1}{N}\sum_{k=0}^{N-1} Y(m, k)e^{j2\pi kn/N}, 0 \le n \le N - 1, \tag{3}$$

for the m-th frame.

In DFT formula (2), frequency bin k corresponds to the physical frequency $$F_{coef}(k) = k * \frac{F_s}{N}, 0 \le k \le N, \tag{4}$$

in Hz, where $F_s$ is the sampling frequency in Hz, and N is the FFT size.

In public switched telephone network (PSTN), the sampling rate is fixed at $F_s$=8000 Hz, resulting in maximum speech bandwidth 4000 Hz based on sampling theorem, which may correspond to the narrow-band case. This sampling rate is also used in voice-over-internet (VOIP) and wireless cellular networks, for example, when the following speech codecs are used: G.711 (α-law and μ-law), G.729, G.723, G.726, AMR, GSM, GSM-HR, GSM-FR, etc. In some instances, a wide-band case with sampling rate $F_s$=16000 Hz and an efficient signal bandwidth 8000 Hz may be used. A wide band coder includes AMR-WB and G.722. Similarly, a full-band sampling rate $F_s$=48000 with efficient signal bandwidth up to 24000 Hz, including Opus codec, may be used.

In the narrow band case, there may be N=256 points, so the FFT has minimum granularity 8000/256=31.25 Hz based on (4) for the N bins, which may also true for the wide band case with N=512. In the full band case, N=1024 points and the FFT has minimum granularity 48000/1024=46.875 Hz. Although it should be noted that other implementations are possible, for clarity of description, this disclosure is described using the full band case, although wide band or narrow bands may also be used. Other sampling rates may be used in other implementations.

At 406, the smart noise cancellation module 307 and/or the audio feature detection module 305 may perform spectral analysis including a signal-to-noise ratio estimate on the one or more frames of the audio signal. For instance, the smart noise cancellation module 307 may perform spectral analysis per frame in the incoming audio signal and, based on the analysis of a set of frames, may estimate one or more signal-to-noise ratios using the spectral analysis.

In some implementations, the spectral analysis may include a computation of a signal power spectral density estimate per critical band (also called sub-band) in one or more frames of the audio signal. For example, in the voice spectrum, the critical bands may be defined by the Bark scale: 100 Hz, 200 Hz, 300 Hz, 400 Hz, 510 Hz, 630 Hz, 770 Hz, 920 Hz, 1080 Hz, 1270 Hz, 1480 Hz, 1720 Hz, 2000 Hz, 2320 Hz, 2700 Hz, 3150 Hz, 3700 Hz, 4400 Hz, 5300 Hz, 6400 Hz, 7700 Hz, 9500 Hz, 12000 Hz, and 15500 Hz. In the narrow band, wide band, and full band cases, there are eighteen, twenty-two, and twenty-five critical bands, respectively.

In some implementations, the signal power spectral density estimate for the i-th critical band may be computed using the following relationship $$E(m, i) = \alpha E(m-1, i) + (1-\alpha) \frac{1}{CB_H(i) - CB_L(i) + 1} \sum_{k=CB_L(i)}^{CB_H(i)} |Y(m, k)|^2, \quad (5)$$

where $0 \leq i < N_c$ a is a smoothing factor, $0 \leq \alpha < 1$, $N_c$ is the number of total critical bands, and $CB_H(i)$ and $CB_L(i)$ are the highest and lowest FFT bins for the i-th critical band, respectively. In some implementations, the smart noise cancellation module 307 (or audio feature detection module 305) may use a value of $\alpha$ including $\alpha=0.45$, $\alpha=0.25$, or $\alpha=0.1$. $N_c=18$, 22, and 25 for narrow band, wide band, and full band with 256, 512, and 1024 FFT points respectively. In the full band case with 1024 point FFT, $CB_H(i)$ and $CB_L(i)$, $0 \leq i \leq N_c$ are provided in the table 1001 illustrated in FIG. 10, which illustrates the critical band bin distribution for the full band 1024 point FFT, for reference.

The smart noise cancellation module 307 (or audio feature detection module 305) may calculate the dB (decibel) value of the signal spectral energy for the i-th critical band, in which the signal spectral energy may be determined using the following relationship $$EdB(m,i) = 10 \log_{10} E(m,i), \quad 0 \leq i \leq N_c. \quad (6)$$

Similarly, the total signal energy in dB based on critical bands may be determined by $$EdB_{total}(m) = \sum_{i=0}^{N_c-1} EdB(m, i), \quad (7)$$

for the m-th frame.

For example, in some implementations, the audio feature detection module 305 may compute the voicing factor per frame based on a signal-to-noise ratio per sub-band, for example, using particular frames to estimate a background noise level. For instance, the audio feature detection module 305 may assume that the first two frames in a phone call contain only noise (e.g., before speech has begun), so that, for example, the noise power spectral density estimate $E_n(m,i)$ is available for sub-bands $0 \leq i \leq N_c$. For a current frame, the audio feature detection module 305 may compute a signal-to-noise ratio $\gamma(m,i)$ for the i-th sub-band in dB is using $$\gamma(m, i) = 10 \log_{10} \frac{E(m, i)}{E_n(m, i)}, \quad 0 \leq i < N_c. \quad (8)$$

The audio feature detection module 305 may quantize the above signal-to-noise ratio in the range [0, 89]. For instance, $\gamma_q(m,i)$ may represent the quantized version of $\gamma(m,i)$. Then, depending on the implementation, the voicing factor may be defined as $$V = \sum_{i=0}^{N_c-1} V(\gamma_q(m, i)), \quad (9)$$

where V(k) is the k-th element of a pre-defined voicing table with 90 elements.

Further details for computing the voicing factor and the signal-to-noise ratio are described at least in reference to FIG. 6, for example.

At 408, the audio feature detection module 305 may identify a noise frame in the one or more frames based on the spectral analysis. For instance, the audio feature detection module 305 may differentiate a noise frame from a speech frame or otherwise detect noise in a frame (e.g., among another sound). In some implementations, the audio feature detection module 305 may identify the noise frame in the one or more frames by determining a voicing factor for each of the one or more frames based on the signal-to-noise ratio estimate, and classifying a frame of the one or more frames as a noise frame based on a value of the voicing factor.

For example, the audio feature detection module 305 may identify a noise frame based on whether the voicing factor falls below, above, or within a defined range. In some instances, if the audio feature detection module 305 determines that the voicing factor falls within the range, it may further base the noise frame identification on a signal spectral deviation and regional statistics of the audio signal. In some instances, if the voicing factor is above a threshold, a voice event may be declared. Example operations for identifying noise are described throughout this disclosure, for example, in reference to FIG. 5 below.

At 410, the smart noise cancellation module 307 may reduce noise in the one or more frames based on the noise frame and spectral analysis on the one or more frames. For example, as described above, the smart noise cancellation module 307 may use a noise decision received from the audio feature detection module 305 (e.g., calculated at 408) to trigger noise cancellation. For example, operations for computing an a priori signal-to-noise ratio estimate (e.g., which may be computed along with, separately from, or in place of the signal-to-noise ratio estimate described at 406 above) and improving noise cancellation performance using multiple different smoothing factors are described in reference to FIG. 7.

At 412, the noise muting module 311 may remove residual noise from the one or more frames. For example, the noise muting module 311 may remove residual noise after processing by the IFFT module 309. For instance, reducing the noise in the one or more frames may be performed in a frequency domain and removing residual noise may be performed in the time domain.

In some implementations, the noise muting module 311 may determine an attenuation gain based on a quantity of noise frames among the one or more frames, and may remove the residual noise in the one or more frames based on the attenuation gain, for example, by applying the attenuation gain to the noisy speech after the IFFT module 309 converts the signal back to a time domain signal. For instance, the noise muting module 311 may set the attenuation gain based on a noise frame counter and one or more thresholds for the noise frame counter, as described in further detail below.

In some implementations, noise muting of the residual noise may be based on noise and speech frame counters that may be determined based on the noise frame decision by the audio feature detection module 305 (e.g., at 408). Initially, both the speech frame counter s_count and noise frame counter n_count may be set to zero. In some implementations, for each frame, the noise muting module 311 may increase the speech counter s_count by one and reset the noise counter n_count=0 if the audio feature detection module 305 identifies speech in that frame. If the audio feature detection module 305 identifies noise in that frame, then the noise muting module 311 may increase the noise counter n_count by one, and reset the speech counter s_count=0.

The noise and speech frame counters may define speech and noise states. In some implementations, there are three residual noise muting states: speech, noise, and transition, which may be represented by the terms NM_SPEECH, NM_NOISE, NM_TRANSITION, respectively. Based on speech and noise counters, the noise muting module 311 may define the muting state nm_state for the noise muting module 311 as follows:

$$nm\_state = \begin{cases} NM\_SPEECH, & \text{if } s\_count > 0 \\ NM\_NOISE, & \text{if } n\_count \geq NM\_LEN0 \\ NM\_TRANSITION, & \text{if } 0 < n\_count < NM\_LEN0 \end{cases} \quad (10)$$

where noise NM_LEN0 is a defined constant, as described below. The signal frame power may be computed using averaging $$Q(m) = \frac{1}{L}\sum_{l=0}^{L-1} \overline{y}((m-1)L+l)^2, 0 \leq l < L, \quad (11)$$

where m is the frame number, L is the frame length (e.g., 80 frames for the narrow band case and 480 frames for the full band case, each with 10 ms frame time, for example), and $\{\overline{y}(n)\}$ is the signal after processing by the IFFT module 309 in FIG. 3. If the noise muting state nm_state is in NM_SPEECH and NM_NOISE, then the noise muting module 311 may update the speech power $P_s(m)$ and noise power $P_n(m)$ using the following formula $$P(m) = (1-\eta)P(m-1) + \eta Q(m), \quad (12)$$

where $\eta$ is the smoothing factor (e.g., ⅛, 1/12, and 1/30).

In some implementations, the noise muting module 311 may monitor the residual noise power level $P_n(m)$ against a noise muting threshold nm_threshold in real time. The nm_threshold may be pre-configured during initial time to be, for example, −56, −50, −44 or −38 dBm (decibels milliwatts). Similarly, the noise muting module 311 may define three different attenuation gains: NM_GAIN0, NM_GAIN1, and NM_GAIN2 (e.g., −12 dB, −24 dB, and −36 dB, respectively), although other implementations are possible.

The noise muting module 311 may set a default noise muting attenuation gain nm_gain=1. In some instances, if the noise muting state nm_state is in NM_NOISE, and the residual noise power level $P_n(m)$ is less than nm_threshold, then the noise muting module 311 may define the attenuation gain nm_gain as follows:

$$nm\_gain = \begin{cases} NM\_GAIN0, & \text{if } NM\_LEN0 \leq n\_count < NM\_LEN1 \\ NM\_GAIN1, & \text{if } NM\_LEN1 \leq n\_count < NM\_LEN2 \\ NM\_GAIN2, & \text{if } n\_count \geq NM\_LEN2 \end{cases} \quad (13)$$

where NM_LEN0, NM_LEN1, and NM_LEN2 are defined (e.g., 27, 29, and 100, respectively) based on the consideration of signal distortion and noise intrusiveness.

In some implementations, once the attenuation gain (13) is determined, the noise muting module 311 may apply it to the audio signal $\{\overline{y}(n)\}$ after processing by the IFFT module 309 in FIG. 3. For example, the noise muting module 311 output signal may be $\{\overline{y}(n)\}$ times the attenuation gain nm_gain for each audio frame.

In some implementations, the smart voice enhancement engine 101 may transmit the enhanced audio signal to an endpoint client device 103 for output by the client device 103 to a user, for example, as described in reference to FIG. 1.

FIG. 5 is a flowchart of an example method for identifying noise in an audio signal, for example, using spectral analysis. For instance, the example method may describe operations for identifying a noise frame among one or more frames in an audio signal, such as during an incoming real-time phone call.

At 502, the audio feature detection module 305 may determine a voicing factor per frame based on signal-to-noise ratio. In some implementations, determining the voicing factor may include estimating a power spectral density using a time-varying smoothing factor, computing the signal-to-noise ratio estimate based on the power spectral density, and/or computing the voicing factor based on the signal-to-noise ratio estimate, for example, as described in reference to FIG. 6 below.

At 504, the audio feature detection module 305 may determine whether the voicing factor satisfies a first threshold. For example, if the voicing factor V is too small and is below a small threshold $\theta_0$ (e.g., the threshold $\theta_0$ may be a constant, such as 54 for the full band case), then the audio feature detection module 305 may classify the current frame as noise at 506. In some implementations, the thresholds may be experimentally determined, refined using machine learning, etc.

If the voicing factor V satisfies the first threshold, the audio feature detection module 305 may determine, at 508, whether the voicing factor V satisfies a second threshold (e.g., whether the voicing factor V falls in a range between the first and second thresholds). For instance, the voicing factor V may be defined to be smaller than a constant $\theta_1$ for a noise frame, so if the voicing vector is bigger than $\theta_1$, then the audio feature detection module 305 may classify current frame as speech at 510.

If the audio feature detection module 305 determines at 504 and 508 that the voicing factor V satisfies the first threshold but does not satisfy the second threshold, for example, in the circumstance that the voicing factor V is computed to be in the range ($\theta_0$, $\theta_1$), then other metrics and algorithms such as signal spectral deviation or pitch detection may be used to help verify whether the frame is a noise frame.

In some implementations, if the voicing factor falls in the range between the first and second threshold, the audio feature detection module 305 may perform additional verifying factors. If the audio feature detection module 305 determines that the frame is a noise frame or a speech frame at 506 or 510, respectively, the audio feature detection module 305 may signal one or more of the other modules of the voice enhancement engine 101 to perform their operations, set a counter (e.g., as described in reference to 412 above), or provide another operation, such as those described herein. For instance, the audio feature detection module 305 may signal the smart noise cancellation module 307 to perform noise cancellation in the noise frame identified by the audio feature detection module 305.

In some implementations, identifying the noise frame in the one or more frames may include verifying the classification of the noise frame using one or more of a spectral deviation estimate and regional statistical features of the audio signal. For example, at 512, the audio feature detection module 305 may determine a spectral deviation estimate and set a spectral deviation flag; and, at 514, the audio feature detection module 305 may determine regional statistical features and set a regional statistics flag.

For example, the spectral deviation estimate may be calculated in various regions of the signal or frequency. For instance, the audio feature detection module 305 may calculate the signal spectral deviation, set the value for a deviation noise counter based on the signal spectral deviation value against a predefined threshold, and set a signal spectral deviation flag (e.g., to 1) if the deviation noise counter is beyond a defined quantity.

Figure 9A:
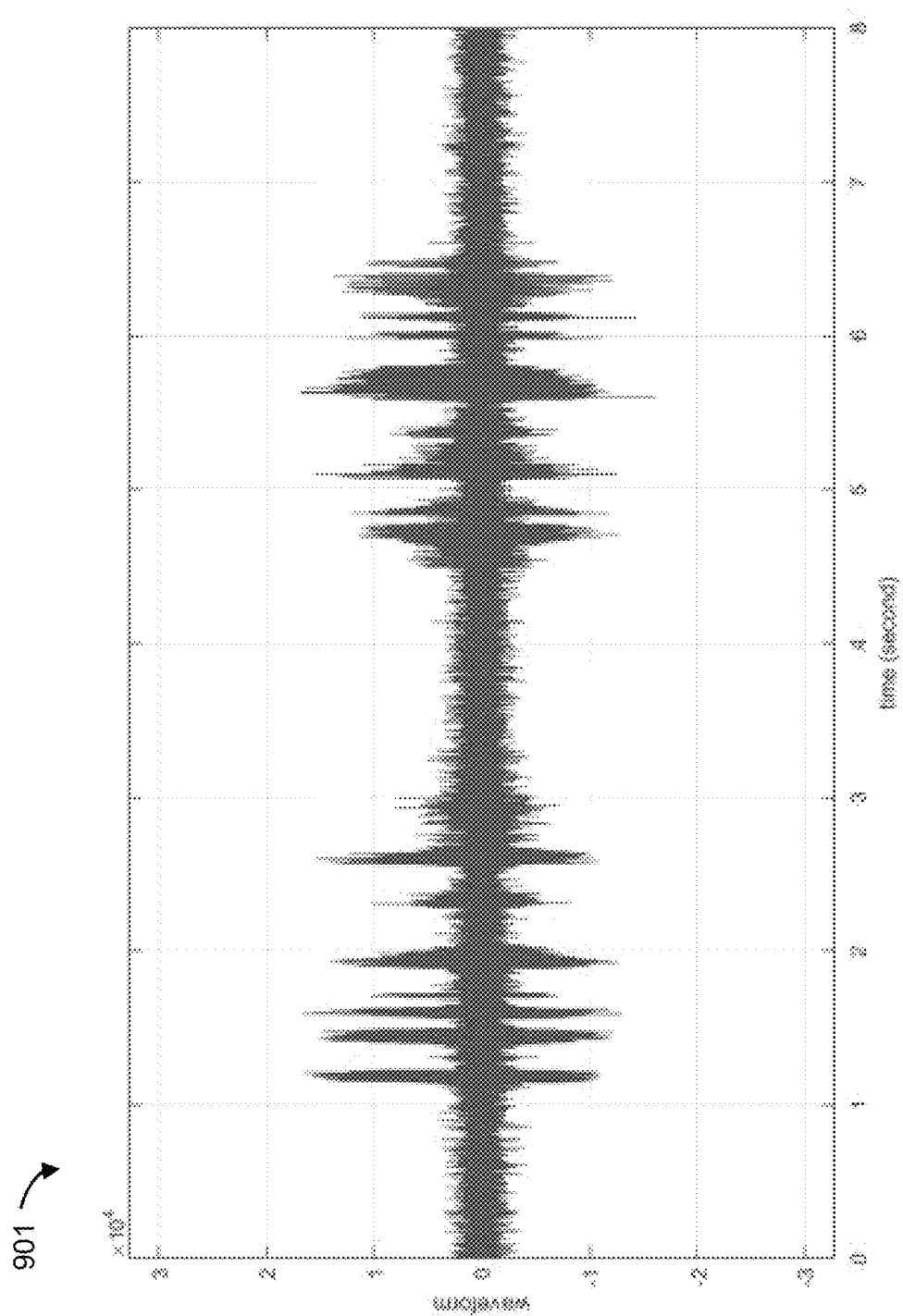
FIGS. 9A-9C illustrate graphs of example waveforms of audio signals including noise.

The audio feature detection module 305 may use the algorithm illustrated in formulas (8)-(9), which may be based on signal-to-noise ratio per critical band. For example, for noisy test vectors with consistent noise profiles, such as is shown in FIG. 9A, the audio feature detection module 305 may identify noise and speech. For example, FIG. 9A illustrates a graph 901 of a waveform across time, in which approximately the first second of the waveform is noise, before speech begins. For example, the noise power spectral density may be estimated correctly during the initial noise portion, then, when noisy speech shows up, the algorithms used by the audio feature detection module 305 are sensitive to signal-to-noise ratio changes, and thus the accuracy of the noise identification is improved.

It should be noted that there are many reasons why the noise profile may change during a phone call. For example, a person may talk in a quiet room and move to a noisy room during a phone call, or vice versa. In some instances, as shown in FIG. 1, the smart voice enhancement engine 101 may be implemented on a server 115, and endpoint client devices 103 (e.g., smartphones) may be equipped with noise cancellation features. In this case, there are redundant noise cancellation operations in the data path, and some portions of the noise may have been removed by the endpoint client devices 103 already when the signal is received by the smart voice enhancement engine 101. This case may further cause noisy calls to have changing profiles, for example, as illustrated in FIGS. 9B and 9C, as observed by the smart voice enhancement engine 101.

Figure 9B:
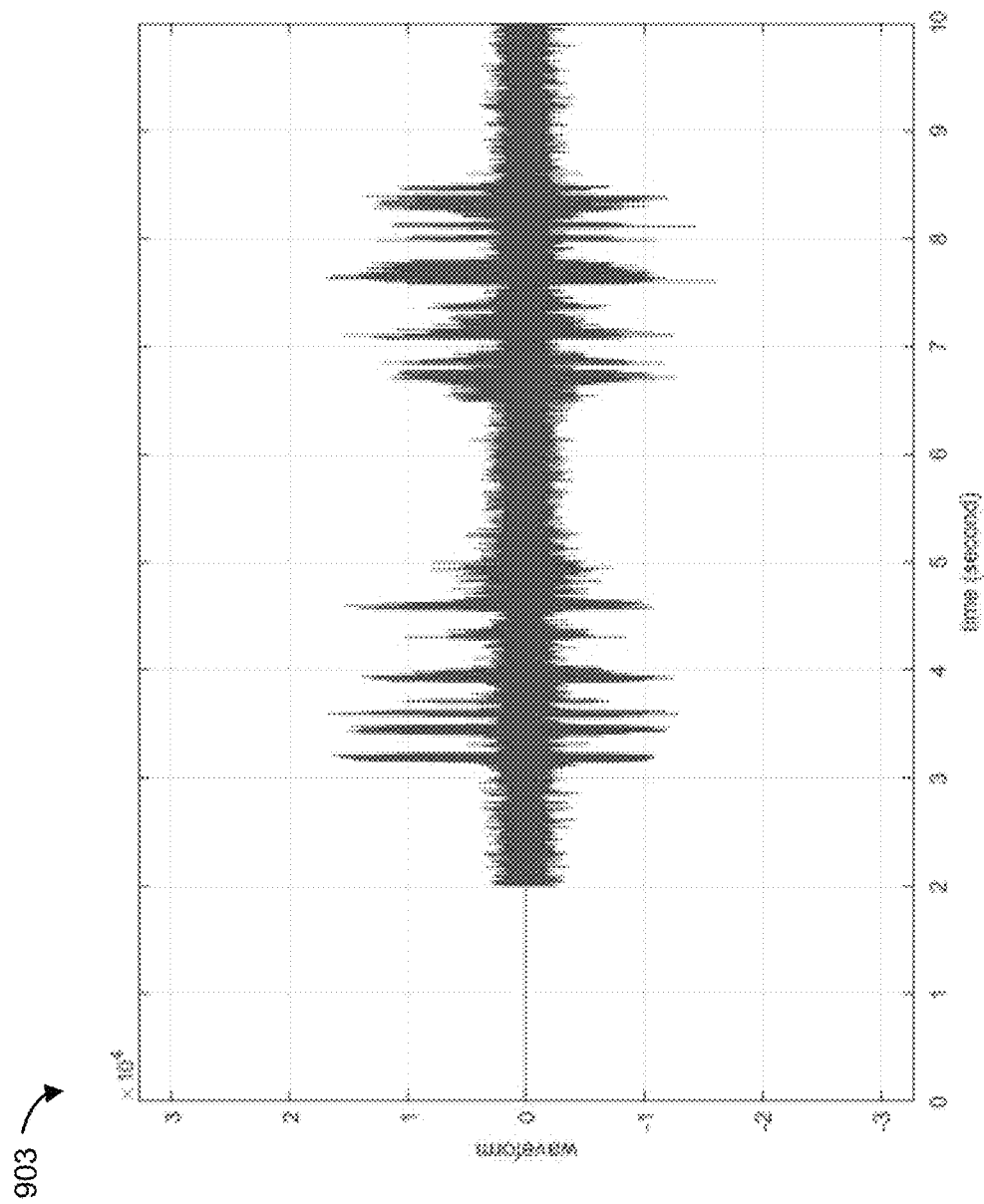

For example, FIG. 9B illustrates a graph 903 of a waveform across time, where the waveform illustrates a noisy test vector with changing noise profiles. As illustrated in FIG. 9B, the noise power spectral density may converge to silence during the first two seconds. When the noise shows up afterwards, the signal power spectral density $E(m,i)$ may change dramatically, which leads to a large signal-to-noise ratio $\gamma(m,i)$, $0 \le i \le N_c$, which may, in turn, cause the formula (9) to generate a large voicing factor, and may cause the frame to be erroneously classified.

Figure 9C:
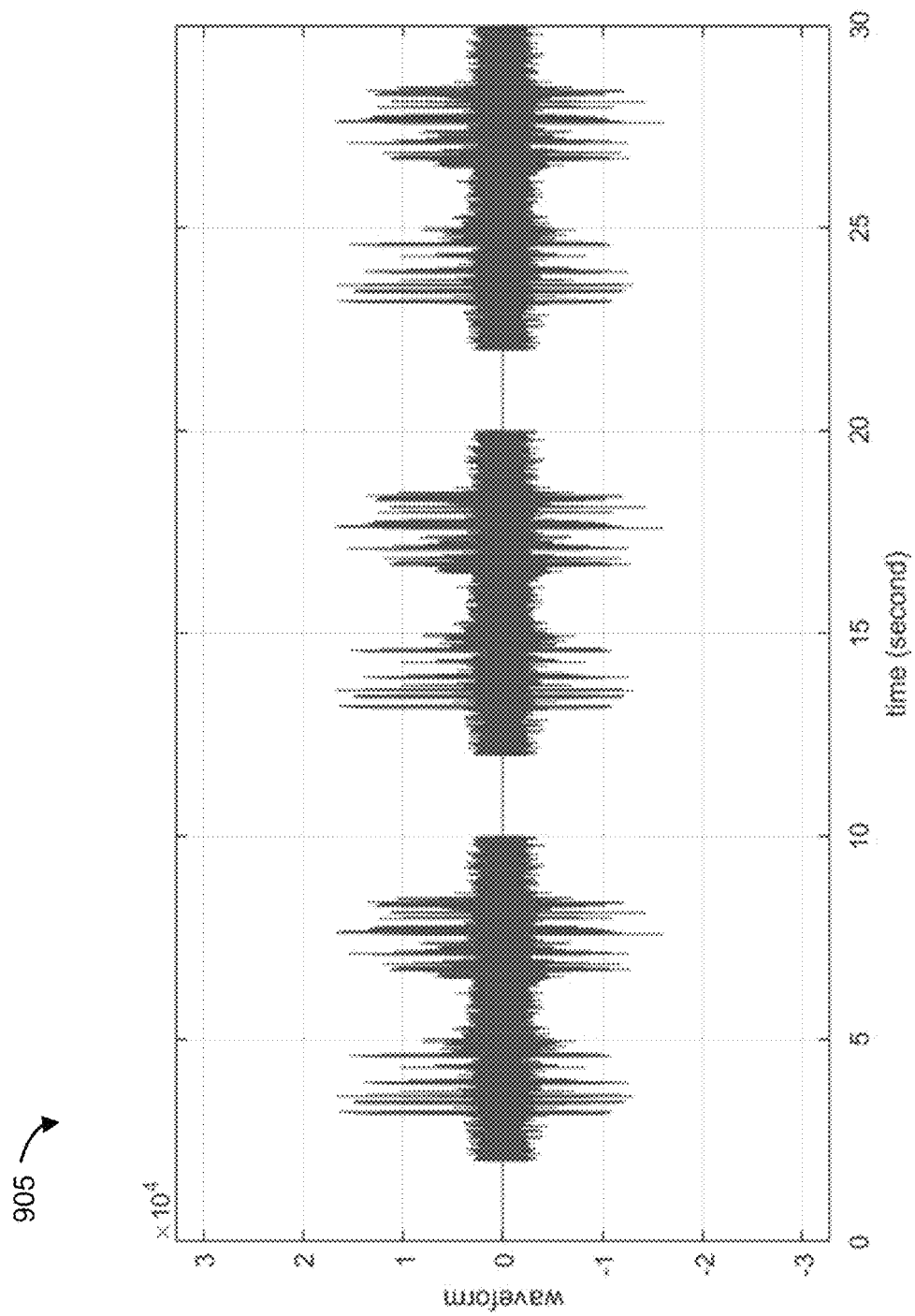

Similarly, FIG. 9C illustrates a graph 905 of a waveform across time, where the waveform illustrates a noisy test vector with changing noise profiles. For example, FIG. 9C illustrates that in a real phone call, the noise profile may change many times, especially where an endpoint client device 103 provides some noise cancellation (e.g., using multiple microphones) before the signal is received by the smart voice enhancement engine 101.

Accordingly, in some implementations, the audio feature detection module 305 may use additional rules independent of the signal signal-to-noise ratio per critical band $\gamma(m,i)$, $0 \le i \le N_c$. For example, the audio feature detection module 305 may use regional statistic (RS) features to solve the problem with changing noise profiles. For example, regional statistic (RS) features may have a very short response time and may represent the statistics of the spectral deviation in the past region (e.g., approximately 0.2 seconds).

Figure 8:
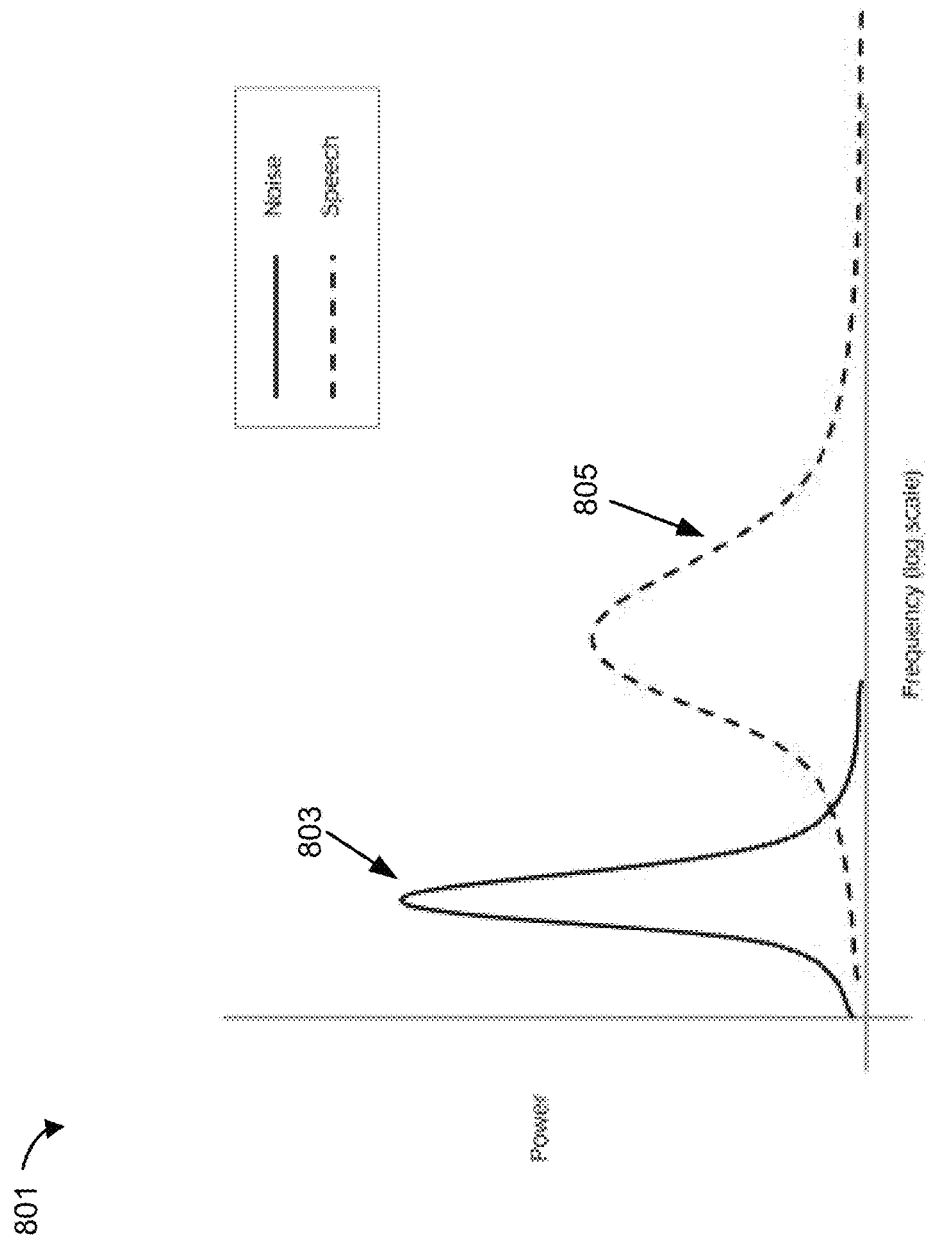
FIG. 8 illustrates graph of a speech and noise spectral deviation in a logarithmic domain.

In some implementations, the regional statistic features be based on spectral deviation between speech and noise. For instance, FIG. 8 illustrates a graph 801 showing speech and noise spectral deviation in a logarithmic domain. The solid line 803 may represent a spectral power of noise and the broken line 805 may represent a spectral power of speech.

Based on the observation that the noise spectral deviation is smaller than the speech spectral deviation as shown in FIG. 8, the audio feature detection module 305 may monitor the signal spectral deviation against a small bound for each frame:

$$\Delta(m) \le B0 \quad (14)$$

where B0 is a constant (e.g., 31 dB in the full band case).

The audio feature detection module 305 may compute the signal spectral deviation using the formula $$\Delta(m) = \sum_{i=0}^{N_c-1} |EdB(m, i) - \overline{EdB(m, i)}|, \quad (15)$$

where $\overline{EdB(m,i)}$ is the long-term power spectral estimate in dB for i-th sub-band.

The audio feature detection module 305 may initially set a count dev_noise_cnt=0. For each frame, if (14) is satisfied, the audio feature detection module 305 may increase this counter dev_noise_cnt by one; otherwise, the audio feature detection module 305 may reset it to zero. The audio feature detection module 305 may determine whether, if in more than $N_{dev}$ consecutive frames, (14) is satisfied, and if it is satisfied, the audio feature detection module 305 may declare the current frame is noise frame and set a flag dev_flag=1, where $N_{dev}$ is a defined number (e.g., 20, 40, or 60).

In some implementations, the audio feature detection module 305 may measure the range of the spectral deviation $\Delta(m)$ to inform the decision whether the frame includes noise. For example, the audio feature detection module 305 may use $\Delta_{min}$ and $\Delta_{max}$ to represent the minimal and maximal spectral deviation during a short time period. The audio feature detection module 305 may initially set a noise pattern counter rs_noise_pattern=0 and set $$\Delta_{min}=\text{DEV\_MAX}, \Delta_{max}=0 \quad (16)$$

where DEV_MAX is a large dB value (e.g., 1000 dB). For each RS_PERIOD frames (e.g., RS_PERIOD may be 10, 20, or 30), the audio feature detection module 305 may compute the minimal and maximal spectral deviation $\Delta(m)$ for frames in this time period. The gap between $\Delta_{min}$ and $\Delta_{max}$ may be defined as $$\delta = \Delta_{max} - \Delta_{min}. \quad (17)$$

For every RS_PERIOD frames, if the following conditions are satisfied simultaneously,
a) $\Delta_{min} \le B1$, where B1 is a constant (e.g., 40 dB for the full band case)
b) $\delta < \Delta_{min}$
c) $EdB_{total}(m) \ge \text{ETOT\_MIN}$ where ETOT_MIN is a small dB number (e.g., 32 dB) the audio feature detection module 305 may increase the noise pattern counter rs_noise_pattern by one. In some instances, if any of the three conditions a), b), or c) is not satisfied, the audio feature detection module 305 may reset rs_noise_pattern=0.

In some implementations, after the above verification (e.g., of the conditions a), b), and c)), the audio feature detection module 305 may reset $\Delta_{min}$ and $\Delta_{max}$ as in (17), and start to measure the range of the spectral deviation D(m) in a new regional statistics region.

In some implementations, for each frame, the audio feature detection module 305 may monitor whether the following condition d) is satisfied (e.g., in addition to conditions a), b), and c)):

d) rs_noise_pattern≥RS_MIN_LEN where RS_MIN_LEN is a small constant (e.g., 1 or 2)

If conditions a)-d) are satisfied simultaneously, the audio feature detection module 305 may declare the current audio frame as a noise frame and set a flag rs_flag=1.

For example, the audio feature detection module 305 may set a regional statistics flag based on a noise pattern counter value and/or the satisfaction of other conditions, such as, for a quantity of frames, i) the minimal signal spectral deviation is within a predefined bound; ii) a compare condition between the minima and the gap of the minima and the maxima of the signal spectral deviation; iii) the total signal energy in dB is above a predefined threshold.

In some implementations, if the audio feature detection module 305 determines that conditions a)-d) are satisfied simultaneously, then the audio feature detection module 305 may classify the current audio frame as noise frame and may set a regional statistics flag rs_flag=1.

At 516, the audio feature detection module 305 may classify frame(s) as noise frame(s) using spectral deviation flag and/or regional statistics flag. For example, if either (e.g., any) of the following conditions 1), 2), 3), and 4) is satisfied, the audio feature detection module 305 may classify the current audio frame as a noise frame; otherwise, it may classify the frame as a speech frame, for example, as described herein.

1) The voicing factor $V \le \theta_0$ where $\theta_0$ is a constant (e.g., 54 for FB)
2) The voicing factor V is in the range $(\theta_0, \theta_1)$ and D(m)≤B1 where B1 is a constant (e.g., 40 dB for FB)
3) dev_flag=1
4) rs_flag=1

It should be noted that conditions 3) and 4) do not depend on the signal-to-noise ratio estimate and have a relatively short response time. Extensive experiments indicate that these features can detect noise frames and solve the problem with changing noise profiles as illustrated in FIGS. 9B and 9C, where noise may include, for example, non-stationary noise such as car noise, train noise, babble noise, or restaurant noise, etc.

FIG. 6 is a flowchart of an example method for computing a voicing factor, according to some implementations.

At 602, the audio feature detection module 305 may calculate an initial noise power spectral density estimate on the audio signal background of one or more frames of the audio signal. For instance, the audio feature detection module 305 may compute the voicing factor (9) based on the signal-to-noise ratio estimate (8), where the noise power spectral density estimate $E_n(m,i)$ may also be used. For example, the audio feature detection module 305 may estimate, in real time, the noise power spectral density $E_n(m,i)$ frame by frame form using the following recursive formula $$E_n(m,i) = (1-\lambda)E_n(m-1,i) + \lambda E(m,i), \quad 0 \le i \le N_c, \quad (18)$$

where $0 \le \lambda < 1$ is a forgetting or smoothing factor. While a small smoothing factor λ may be used in some implementations, a small λ (e.g., λ=0.02) may have disadvantages in some circumstances, such as that it may takes a significant amount of time to get accurate noise power spectral density estimate during the initial time and the resulting computation may be too slow to track non-stationary noise power spectral density. In such instances, the noise frame decision accuracy may be negatively affected. Accordingly, in some implementations, the audio feature detection module 305 may use a varying smoothing factor, as described in further detail below.

In some implementations, the audio feature detection module 305 may compute an initial noise power spectral density estimate $E_n\_init(i)$ using, for example, the following averaging formula $$E_n\_init(i) = \frac{1}{N_{init}} \sum_{l=0}^{N_{init}-1} E(n(l), i), \quad 0 \le i < N_c, \quad (19)$$

where $n(l)$, $0 \le l \le N_{init}-1$ are the noise frame numbers for the first $N_{init}$ noise frames. The averaging estimate may use the fact that $N_{init}$ noise frames are available. In some instances, the audio feature detection module 305 may not know when the $N_{init}$ noise frames show up in the audio signal, so the result of the formula (19) may not be available at the beginning of the audio signal, unlike a non-real time or offline computation where the noise power spectral density may be calculated by first reading a file.

In some implementations, the audio feature detection module 305 may update the noise poser spectral density, as described below, for instance, the audio feature detection module 305 may use a combination of (18) and (19) to obtain an initial accurate noise power spectral density estimate. For instance, the audio feature detection module 305 may calculate the initial estimate (19) on the background, for example, such that each new noise frame contributes the following portion $$\frac{1}{N_{init}} E(n(l), i), \quad 0 \le i < N_c.$$

The audio feature detection module 305 may calculate noise power spectral density $E_n(m,i)$ used in (8) as follows, depending on the implementation.

In some implementations, at 604, the audio feature detection module 305 may determine a current frame for processing. For instance, the current frame for processing may be a current incoming frame or a next frame in a sequence of frames.

At 606, the audio feature detection module 305 may determine a time-varying smoothing factor based on the current frame. In some implementations, the audio feature detection module 305 may select a time-varying smoothing factor λ in (18) as follows:

$$\lambda = \begin{cases} 1, & \text{if } 0 \le m < m_0 \\ 0.5, & \text{if } m_0 \le m < m_1 \\ 0.4, & \text{if } m_1 \le m < m_2 \\ 0.25, & \text{if } m_2 \le m < N_{init} \\ 0.1, & \text{if } m \ge N_{init} \end{cases} \quad (20)$$

Where, as indicated above, m is the number of the current frame. For example, in some implementations: $m_0=2$, $m_1=4$, $m_2=6$, $N_{init}=8$. For instance, this example may illustrate the selection of the smoothing factor $\lambda$ for the initial 8 noise frames to calculate the noise power spectral density. For instance, if the audio feature detection module 305 assumes that the first two frames are noise with smoothing factor $\lambda=1$, the next two frames may be speech or noise. In the case of noise, the audio feature detection module 305 may use smoothing factor $\lambda=0.5$ to calculate the noise power spectral density, continuing the example, (20) may be used for the noise power spectral calculation for the first eight noise frames. In some implementations, to avoid assuming that the eight noise frames show up, when the eighth noise frame shows up, the operations described for calculating the noise power spectral density may be used to generate a more accurate noise power spectral density estimate. This process may be applied multiple times dynamically to noise power spectral density estimation in a single call, as described herein.

At 608, the audio feature detection module 305 may determine the average noise power spectral density estimate using time-varying smoothing factor. For example, the audio feature detection module 305 may calculate the arithmetic average of the noise power spectral density on the background using plural number of noise frames and, in some instances, may replace the actually used noise power spectral density by the arithmetic averaging after plural number of noise frames (e.g., as described below).

In some implementations, at the end of the $(N_{init}-1)$-th noise frame (e.g., when (19) is available), the audio feature detection module 305 may set the noise power spectral density $E_n(m,i)=E_{n\_init}(i)$.

After $N_{init}$ noise frames, the audio feature detection module 305 may use the averaging (19) estimate as initial noise power spectral density for the updating scheme of formula (18). For instance, in some implementations, the initial noise power spectral density may be based on an assumption that the first one or two frames of the incoming audio contain noise frames, although other implementations are possible, as described in the reference to the updating scheme herein.

In some implementations, at 610, the audio feature detection module 305 may determine whether there is an additional frame for which to process the average noise power spectral density, and, at 612, the audio feature detection module 305 may compute a signal-to-noise ratio estimate using average noise power spectral density estimate (e.g., over the set of frames). For example, as described in reference to 602-608, the audio feature detection module 305 may update the actually (e.g., the noise frame used, which may be updated from that used in the initial frames) used noise power spectral density using a recursive filter with a time-varying smoothing factor. In some instances, the audio feature detection module 305 may replace an actually used noise power spectral density by the arithmetic average over a plural number of frames.

At 614, the audio feature detection module 305 may compute a voicing factor based on signal-to-noise ratio estimate, for example, as described in further detail in reference to 406 and 502 in FIGS. 4 and 5, respectively.

Figure 7:
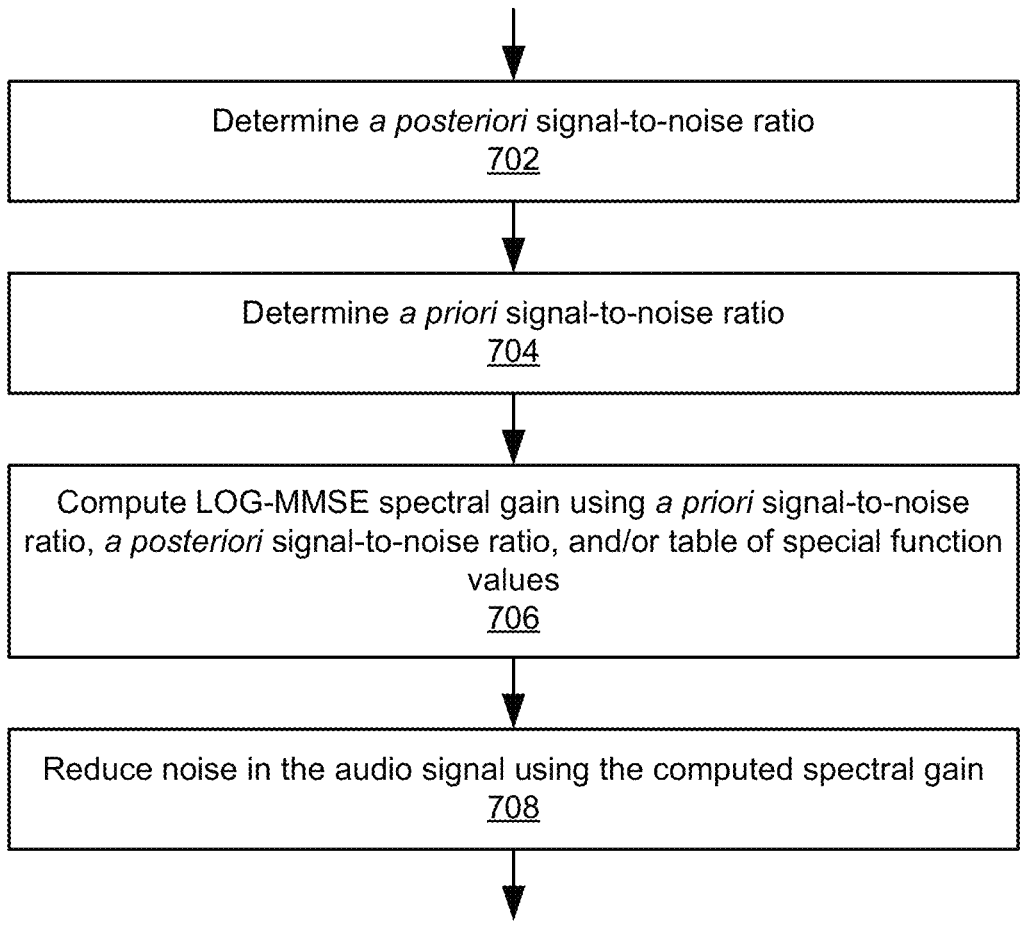
FIG. 7 is a flowchart of an example method for performing noise cancellation, according to some implementations.

FIG. 7 is a flowchart of an example method for performing noise cancellation, according to some implementations.

Let $\{X(k)\}$, $\{D(k)\}$, and $\{Y(k)\}$ respectively represent the clean speech, noise, and the noisy speech signals in a frequency domain. The smart noise cancellation module 307 may use the direct Fourier Transform (2) or Fast Fourier Transform may convert linear equation (1) in time domain to frequency domain:

$$Y(k)=Y_kX(k)+D(k),\ 0\leq k<N, \quad (21)$$

where N is the FFT size, and the frame number m is omitted for brevity whenever there is no ambiguity. The complex numbers can be represented as follows:

$$Y(k)=Y_ke^{j\theta_Y(k)},\ X(k)=X_ke^{j\theta_X(k)},\ D(k)=D_ke^{j\theta_D(k)}, \quad (22)$$

where $Y_k$, $X_k$, and $D_k$ are amplitudes, and $\theta_Y(k)$, $\theta_X(k)$, and $\theta_D(k)$ are the phases respectively.

Let $\hat{X}_k$ be an estimate of $X_k$. The smart noise cancellation module 307 may use the LOG-MMSE algorithm to find an optimum estimate in the sense of minimum mean square error (MMSE) in the logarithmic domain:

$$J=\min E(\log X_k-\log \hat{X}_k)^2. \quad (23)$$

Under the Gaussian assumption on the random processes $\{X(k)\}$ and $\{D(k)\}$, the optimum solution can be represented by $$\hat{X}_k=G(\xi_k,v_k)Y_k,\ 0\leq k<N, \quad (24)$$

where the gain function $$G(\xi_k, v_k) = \frac{\xi_k}{\xi_k + 1}e^{\frac{1}{2}\int_{v_k}^{\infty} e^{-t}\frac{1}{t}dt}, \quad (25)$$

$$\xi_k = \frac{E[X_k^2]}{E[D_k^2]},\ \gamma_k = \frac{Y_k^2}{E[D_k^2]},\ v_k = \frac{\xi_k}{\xi_k + 1}\gamma_k. \quad (26)$$

$\xi_k$ and $\gamma_k$ represent the a priori signal-to-noise ratio and a posteriori signal-to-noise ratio, respectively. Assume that the phase of X(k) and Y(k) are the same. Then $$\hat{X}(k)=G(\xi_k,v_k)Y_ke^{j\theta_X(K)}=G(\xi_k,v_k)Y(k),\ 0\leq k<N. \quad (27)$$

At 702, the smart noise cancellation module 307 may determine an a posteriori signal-to-noise ratio. For instance, the smart noise cancellation module 307 may compute an a posteriori signal-to-noise ratio. For instance, the a posteriori and a priori signal-to-noise ratios are defined above.

In some implementations, the smart noise cancellation module 307 may compute an estimate $\gamma_k(m)$ for the a posteriori signal-to-noise ratio $\gamma_k$ at frame m, and using the formula $$\gamma_k(m) = \frac{Y_k(m)^2}{E_n(m, k)}, 0 \leq k < N. \quad (28)$$

Where $Y_k(n)$ is the noisy speech PSD for the k-th frequency bin, and $E_n(m,k)$ is the noise power spectral density estimate energy at frame m for the k-th frequency bin, for example, as described in further detail above.

At 704, the smart noise cancellation module 307 may determine an a priori signal-to-noise ratio, for example, using a multiple averaging scheme and using multiple (e.g., three) smoothing factor values. In some implementations, the smart noise cancellation module 307 may calculate the a priori signal-to-noise ratio using previous averaging noisy speech power spectral density with a smoothing factor, for example, for a previous frame. In some instances, the noise power spectral density estimate may be calculated separately for noise cancellation than it is for noise detection, as described above.

In some implementations, the smart noise cancellation module 307 may compute the a priori signal-to-noise ratio estimate $\xi_k$ in (23) for the LOG-MMSE algorithm (e.g., described below). In some implementations, the smart noise cancellation module 307 may use a decision-direct approach, which is given below:

$$\hat{\xi}_k(0) = (1-\alpha) + \alpha \max(\gamma_k(0) - 1, 0), \quad (29)$$

$$\hat{\xi}_k(m) = \max\left\{(1-\alpha)\frac{\hat{X}_k(m-1)^2}{E_n(m,k)} + \alpha \max(\gamma_k(m) - 1, 0), \xi_{min}\right\}, \quad (30)$$

where m is the frame number, $\xi_{min}$=−25 dB, $\hat{X}_k(m-1)^2$ is speech power spectral density estimate in the previous frame, and $0 \le \alpha < 1$ is a smoothing factor (e.g., 0.01, 0.02, or 0.04). As described above, $\gamma_k(m)$ is an estimate for the a posteriori signal-to-noise ratio $\gamma_k$ at frame m, and is given by (28).

Note that $\hat{X}_k(m-1)^2$ the estimate for $E[X_k^2]$ in the previous frame.

In some implementations, there is only one smoothing factor $\alpha$ to control in the above decision-direct approach, but for stationary noise, a small $\alpha$ may be preferred, while for non-stationary noise, a relatively larger $\alpha$ performs better. Accordingly, in some implementations, the smart noise cancellation module 307 may compute the a priori signal-to-noise ratio estimate using a plurality of smoothing factors, for instance, the smart noise cancellation module 307 may select one or more of three smoothing factors ($\alpha$, $\beta$, $\mu$) during computation of the a priori signal-to-noise ratio estimate. It is noted that the decision-direct approach comes from the observation $$\xi_k(m) = E\left\{\frac{1}{2}\frac{X_k(m)^2}{E[D_k(m)^2]} + \frac{1}{2}(\gamma_k(m) - 1)\right\}, \quad (31)$$

where $E[\gamma_k(m)]$ may be estimated, which estimation may include estimating $E[Y_k(m)^2]$.

In some implementations, the smart noise cancellation module 307 may improve the estimate for $E[Y_k(m)^2]$ using $\bar{Y}_k(m)^2$:

$$\bar{Y}_k(m)^2 = (1-\alpha)\bar{Y}_k(m-1)^2 + \alpha Y_k(m)^2. \quad (32)$$

The smart noise cancellation module 307 may then improve the estimate for $E[(\gamma_k(m)-1)]$ term in (31) using $\bar{\xi}_k(m)$.

$$\bar{\xi}_k(m) = \max\{(1-\beta)\bar{\xi}_k(m-1) + \beta \max(\bar{\gamma}_k(m) - 1, 0), \xi_{min}\}, \quad (33)$$

$$\bar{\gamma}_k(m) = \frac{\bar{Y}_k(m)^2}{E_n(m,k)}, \quad (34)$$

where $\xi_{min}$=−25 dB and $0 \le \beta < 1$ is a smoothing factor, for example.

The smart noise cancellation module 307 may then estimate $\hat{\xi}_k(m)$ using the previous result $\bar{\xi}_k(m)$.

$$\hat{\xi}_k(m) = \max\left\{(1-\mu)\frac{\hat{X}_k(m-1)^2}{E_n(m,k)} + \mu\bar{\xi}_k(m), \xi_{min}\right\}, \quad (35)$$

where $0 \le \mu < 1$ is a smoothing factor and $\hat{X}_k(m-1)^2$ is the speech power spectral density estimate in the previous frame, where $0 \le k < N$.

In some implementations, the smart noise cancellation module 307 may compute the a priori signal-to-noise ratio estimate using (32)-(35), where there are three parameters ($\alpha$, $\beta$, $\Xi$) that it may control. For example, for the full band case, the smart noise cancellation module 307 may define the smoothing factors, such as ($\alpha$=0.75, $\beta$=0.9, $\mu$=0.04), for improved voice quality of the smart noise cancellation algorithm.

It should be noted that, in some instances, the smart noise cancellation module 307 may calculate the noise power spectral density estimate $E_n(m,k)$ in smart noise cancellation separately from (18) in noise frame detection. In some instances, the smart noise cancellation module 307 may estimate, in real time, the noise power spectral density $E_n(m,k)$ frame by frame form $m \ge 0$, using the following recursive formula $$E_n(m,k) = (1-\alpha)E_n(m-1,k) + \lambda Y_k(m)^2, \ 0 \le k < N, \quad (36)$$

where $0 \le \lambda < 1$ is a forgetting or smoothing factor, which may be determined as follows:

$$\lambda = \begin{cases} 0.4375, & \text{for the 1st two noise frames} \\ 0.25, & \text{for the later four noise frames} \\ 0.02, & \text{for all other noise frames} \end{cases} \quad (37)$$

At 706, the smart noise cancellation module 307 may compute the LOG-MMSE spectral gain using the a priori signal-to-noise ratio, the a posteriori signal-to-noise ratio, and/or a table of special function values and, at 708, the smart noise cancellation module 307 may reduce noise in the audio signal using the computed spectral gain. For example, reducing the noise in the one or more frames may include calculating a log-minimum mean square error ("MMSE") spectral gain based on an a priori signal-to-noise ratio and an a posteriori signal-to-noise ratio and applying the LOG-MMSE spectral gain to the signal in the one or more frames.

The smart noise cancellation module 307 may compute the gain function $$G(\xi_k, \nu_k) = \frac{\xi_k}{\xi_k + 1} f(\nu_k), \quad (38)$$

where $$f(x) = e^{0.5 \exp int(x)}, \ \exp int(x) = \int_x^\infty e^{-t}\frac{1}{t}dt. \quad (39)$$

In some implementations, the smart noise cancellation module 307 may use the calculation of the function $f(x)$ to implement the LOG-MMSE solution (24)-(27). Considering that some implementations of the smart voice enhancement engine 101 are implemented on the server-side (e.g., on the server 115), calculating $f(x)$ in real-time may involve very high processor usage, especially when many voice channels are handled by the server 115.

In some implementations, the smart noise cancellation module 307 may simplify the calculation of the spectral gain in the LOG-MMSE algorithm by generating a table of values, which may be used to more efficiently compute, for example, the gain function. For example, the smart noise cancellation module 307 may create a table for the special function ƒ(x) with exponential integral function as the power of an exponential function, in a defined interval with a quantity of incremental dB value. For instance, the smart noise cancellation module 307 may obtain a value of the special function based on a linear interpolation of the accurate function values. Accordingly, in some implementations, the smart noise cancellation module 307 may calculate the special function using the table and linear interpolation in real-time. For instance, reducing the noise in the one or more frames may include using the table to calculate the LOG-MMSE spectral gain while receiving the audio data.

In some implementations, the smart noise cancellation module 307 may use linear interpolation to obtain the estimate $\hat{f}(x)$ for $f(x)$ when $x \in [a,b]$, $$\hat{f}(x) = f(a) + \frac{x-a}{b-a}(f(b) - f(a)). \quad (40)$$

To obtain this estimate, the smart noise cancellation module 307 may generate a table for the function ƒ(x) in an interval (e.g., [−60 dB, 11.5 dB] with 0.5 dB increments).

For example, FIGS. 11A, 11B, 11C, and 11D illustrate a table 1101 of special function ƒ(x) calculations. The first column 1103 is the value a in dB, for example, a∈[−60 dB,11.5 dB], where α=−60+0.5n, n=0, 1, . . . , 143. The second column 1105 is the linear value of a. The third column 1107 is the value of ƒ(a). The fourth column 1109 is the value 1/(b−a) for interpolation, which may save a real-time division operation by the smart (noise cancellation module 307.

As an example, the table 1101 may be implemented in C programming language as follows, although other implementations are possible and contemplated herein: const double expint_table[NUM_ROW_EXPINT][NUM_COLUMN_EXPINT], where NUM_ROW_EXPINT=144, NUM_COLUMN_EXPINT=4. The four columns are described above.

Supposing that x∈[a,b], where a=expint_table[idx−1][1], b=expint_table[idx][1] for some index idx. Then ƒ(a)=expint_table[idx−1][2], ƒ(b)=expint_table[idx][2]

In some implementations, the smart noise cancellation module 307 may compute θ(x) using the values in the table 1101 and the interpolation $$\hat{f}(x)=f(a)+(x-a)(f(b)-f(a))\text{expint\_table[idx][3]}. \quad (41)$$

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures, and other aspects are not mandatory, and the mechanisms that implement the invention or its features may have different names, divisions and/or formats. The foregoing description, for purpose of explanation, has been described with reference to specific examples. However, the illustrative discussions above are not intended to be exhaustive or limiting to the precise forms disclosed. Many modifications and variations are possible in view of the above teachings. The examples were chosen and described in order to best explain relevant principles and their practical applications, to thereby enable others skilled in the art to best utilize various examples with or without various modifications as may be suited to the particular use contemplated.

What is claimed is:

1. A computer-implemented method comprising:
   receiving, by a computing device, audio data describing an audio signal;
   determining, by the computing device, one or more frames of the audio signal using the audio data;
   performing, by the computing device, spectral analysis on the one or more frames of the audio signal, the spectral analysis including a signal-to-noise ratio estimate;
   identifying, by the computing device, a noise frame in the one or more frames based on the spectral analysis, the identifying including using at least one of a spectral deviation estimate and regional statistical features of the audio signal; and
   reducing, by the computing device, noise in the one or more frames based on the noise frame and the spectral analysis on the one or more frames of the audio signal.

2. The method of claim 1, wherein reducing the noise in the one or more frames comprises:
   calculating a log-minimum mean square error ("LOG-MMSE") spectral gain based on an a priori signal-to-noise ratio and an a posteriori signal-to-noise ratio; and
   applying the LOG-MMSE spectral gain to the one or more frames.

3. The method of claim 2, wherein the a priori signal-to-noise ratio is calculated using three different smoothing factor values.

4. The method of claim 2, wherein reducing the noise in the one or more frames comprises:
   generating a table with values of a function of a LOG-MMSE spectral gain function; and
   using the table to calculate the LOG-MMSE spectral gain in while receiving the audio data.

5. The method of claim 1, further comprising:
   determining, by the computing device, an attenuation gain based on a quantity of noise frames in the one or more frames; and
   removing, by the computing device, residual noise in the one or more frames based the attenuation gain.

6. The method of claim 5, wherein:
   reducing the noise in the one or more frames is performed in a frequency domain; and
   removing the residual noise is performed in a time domain.

7. The method of claim 1, wherein determining the one or more frames of the audio signal using the audio data comprises performing a Fast Fourier Transform with a windowing function.

8. The method of claim 1, wherein identifying the noise frame in the one or more frames comprises:
   determining a voicing factor for each of the one or more frames based on the signal-to-noise ratio estimate; and
   classifying a frame of the one or more frames as the noise frame based on a value of the voicing factor.

9. The method of claim 8, wherein identifying the noise frame in the one or more frames further comprises:
verifying the classifying of the noise frame using the spectral deviation estimate and the regional statistical features of the audio signal.

10. The method of claim 1, further comprising:
calculating the spectral deviation estimate;
setting a spectral deviation flag based on the spectral deviation estimate satisfying a threshold; and
verifying the classifying of the noise frame using the spectral deviation flag.

11. The method of claim 9, further comprising:
computing a minimal spectral deviation for the one or more frames;
computing a maximal spectral deviation for the one or more frames;
setting a regional statistics flag based on one or more of the minimal spectral deviation satisfying a threshold and a gap between the minimal spectral deviation and the maximal spectral deviation; and
verifying the classification of the noise frame using the regional statistics flag.

12. The method of claim 8, wherein determining the voicing factor comprises:
estimating a power spectral density using a time-varying smoothing factor;
computing the signal-to-noise ratio estimate based on the power spectral density; and
computing the voicing factor based on the signal-to-noise ratio estimate.

13. A system comprising:
at least one processor; and
a non-transitory computer memory storing instructions that, when executed by the at least one processor, cause the system to perform a method comprising:
receiving audio data describing an audio signal;
determining one or more frames of the audio signal using the audio data;
performing spectral analysis on the one or more frames of the audio signal, the spectral analysis including a signal-to-noise ratio estimate;
identifying a noise frame in the one or more frames based on the spectral analysis, the identifying including using at least one of a spectral deviation estimate and regional statistical features of the audio signal; and
reducing noise in the one or more frames based on the noise frame and the spectral analysis on the one or more frames of the audio signal.

14. The system of claim 13, wherein reducing the noise in the one or more frames comprises:
calculating a log-minimum mean square error ("LOG-MMSE") spectral gain based on an a priori signal-to-noise ratio and an a posteriori signal-to-noise ratio; and
applying the LOG-MMSE spectral gain to the one or more frames.

15. The system of claim 14, wherein the a priori signal-to-noise ratio is calculated using three different smoothing factor values.

16. The system of claim 14, wherein reducing the noise in the one or more frames comprises:
generating a table with values of a function of a LOG-MMSE spectral gain function; and
using the table to calculate the LOG-MMSE spectral gain in while receiving the audio data.

17. The system of claim 13, further comprising:
determining an attenuation gain based on a quantity of noise frames in the one or more frames; and
removing residual noise in the one or more frames based the attenuation gain.

18. The system of claim 17, wherein:
reducing the noise in the one or more frames is performed in a frequency domain; and
removing the residual noise is performed in a time domain.

19. The system of claim 13, wherein identifying the noise frame in the one or more frames comprises:
determining a voicing factor for each of the one or more frames based on the signal-to-noise ratio estimate; and
classifying a frame of the one or more frames as the noise frame based on a value of the voicing factor.

20. The system of claim 19, wherein identifying the noise frame in the one or more frames further comprises:
verifying the classifying of the noise frame using the spectral deviation estimate and the regional statistical features of the audio signal.

21. The system of claim 19, wherein determining the voicing factor comprises:
estimating a power spectral density using a time-varying smoothing factor;
computing the signal-to-noise ratio estimate based on the power spectral density; and
computing the voicing factor based on the signal-to-noise ratio estimate.

22. A computer system, comprising:
at least one processor;
a computer memory;
a Fourier Transform module receiving audio data describing an audio signal and determining a set of frames of the audio signal using the audio data;
an audio feature detection module performing spectral analysis on the one or more frames of the audio signal, and identifying a noise frame in the one or more frames based on the spectral analysis, the spectral analysis including a signal-to-noise ratio estimate, the identifying including using at least one of a spectral deviation estimate and regional statistical features of the audio signal; and
a noise cancellation module reducing noise in the one or more frames based on the noise frame and the spectral analysis on the one or more frames of the audio signal.

23. A computer-implemented method, comprising:
receiving, by a computing device, audio data describing an audio signal;
determining, by the computing device, one or more frames of the audio signal using the audio data;
performing, by the computing device, a spectral analysis on the one or more frames of the audio signal, the spectral analysis including a signal-to-noise ratio estimate;
identifying, by the computing device, a noise frame in the one or more frames based on the spectral analysis, the identifying including:
determining a voicing factor for each of the one or more frames based on the signal-to-noise ratio estimate and whether the voicing factor satisfies at least one voicing threshold condition;
determining if a spectral deviation satisfies a spectral deviation threshold condition;
determining if regional statistics satisfies a regional statistics threshold condition;

classifying a frame of the one or more frames as the noise frame based on the voicing factor satisfying the at least one voicing threshold condition, the spectral deviation satisfying the spectral deviation threshold condition, and the spectral deviation satisfying the regional statistics threshold condition; and reducing, by the computing device, noise in the one or more frames based on the noise frame and the spectral analysis on the one or more frames of the audio signal.

* * * * *